United States Patent
Tsuyuki

(10) Patent No.: US 12,554,184 B2
(45) Date of Patent: Feb. 17, 2026

(54) ENCASEMENT APPARATUS AND PROJECTION SYSTEM

(71) Applicant: CASIO COMPUTER CO., LTD., Tokyo (JP)

(72) Inventor: Yasuhiro Tsuyuki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 547 days.

(21) Appl. No.: 18/084,317

(22) Filed: Dec. 19, 2022

(65) Prior Publication Data

US 2023/0194965 A1 Jun. 22, 2023

(30) Foreign Application Priority Data

Dec. 21, 2021 (JP) ................... 2021-206585

(51) Int. Cl.
*G03B 21/14* (2006.01)
*G03B 21/16* (2006.01)
*H05K 7/20* (2006.01)

(52) U.S. Cl.
CPC ........... *G03B 21/145* (2013.01); *G03B 21/16* (2013.01); *H05K 7/20136* (2013.01)

(58) Field of Classification Search
CPC ........ G03B 21/00; G03B 21/14; G03B 21/16; G03B 21/145; H04N 9/00; H04N 9/3141; H04N 9/3144; H05K 7/00; H05K 7/1427; H05K 7/20136; H05K 7/20909
See application file for complete search history.

(56) References Cited

U.S. PATENT DOCUMENTS

| | | | |
|---|---|---|---|
| 10,856,444 B2* | 12/2020 | Sato | H05K 7/20409 |
| 2007/0024817 A1* | 2/2007 | Nakagawa | G03B 21/16 353/57 |
| 2007/0115438 A1* | 5/2007 | Tsubura | G03B 21/16 353/57 |
| 2020/0296859 A1* | 9/2020 | Takagi | F25B 39/022 |
| 2021/0153393 A1* | 5/2021 | Imura | H05K 5/0213 |

FOREIGN PATENT DOCUMENTS

| | | |
|---|---|---|
| JP | 2003-156795 A | 5/2003 |
| JP | 2008-076806 A | 4/2008 |
| JP | 2008-250279 A | 10/2008 |
| JP | 2010-164685 A | 7/2010 |
| JP | 2015-036789 A | 2/2015 |
| JP | 2020-016737 A | 1/2020 |

OTHER PUBLICATIONS

JPO; Application No. 2021-206585; Notice of Reasons for Refusal dated Feb. 21, 2024.
JPO; Application No. 2021-206585; Notice of Reasons For Refusal dated Oct. 31, 2023.

* cited by examiner

*Primary Examiner* — Sultan Chowdhury
(74) *Attorney, Agent, or Firm* — Fitch, Even, Tabin & Flannery LLP

(57) ABSTRACT

An encasement apparatus includes a case main body configured to freely encase equipment in an inside portion thereof, and the case main body has a first partition wall configured to divide a space in the inside portion into a first isolated space and a second isolated space together with the equipment in such a state that the equipment is encased in the inside portion.

17 Claims, 16 Drawing Sheets

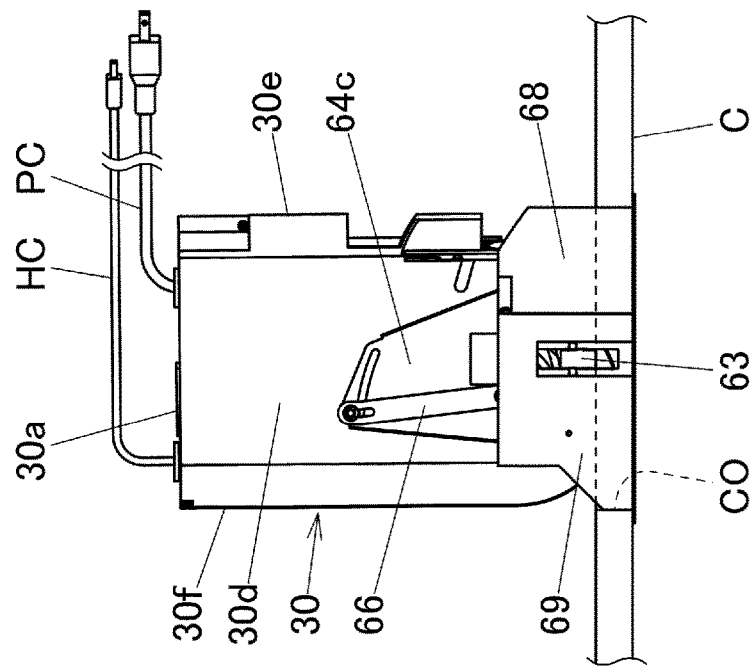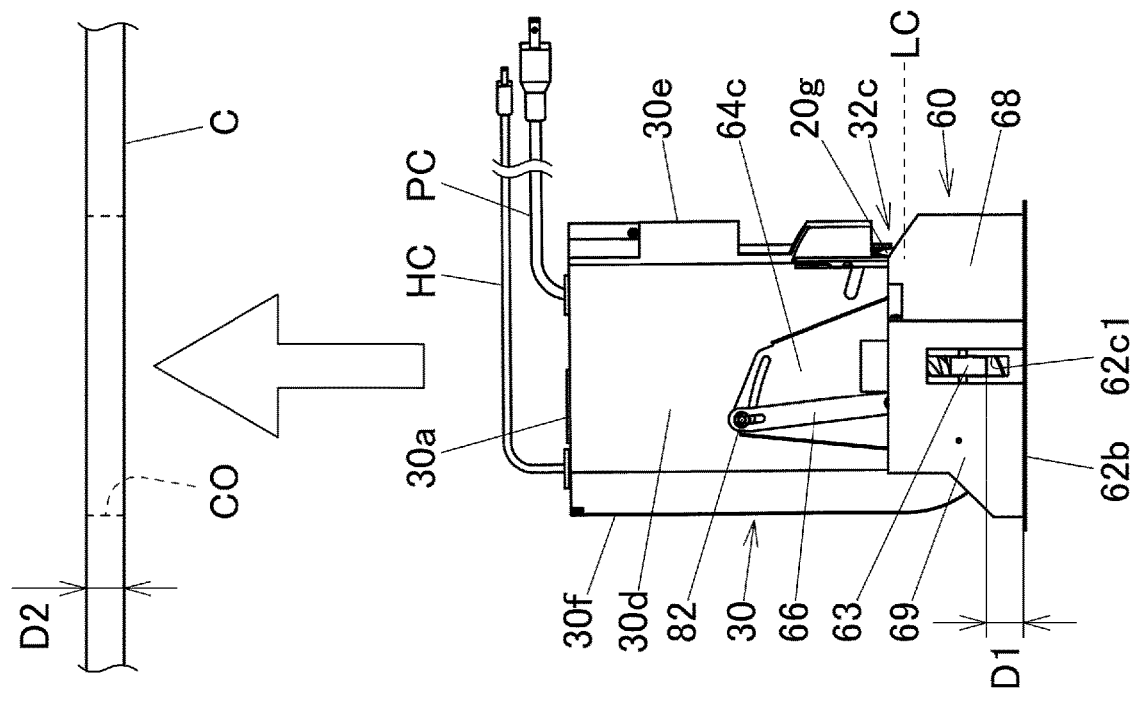

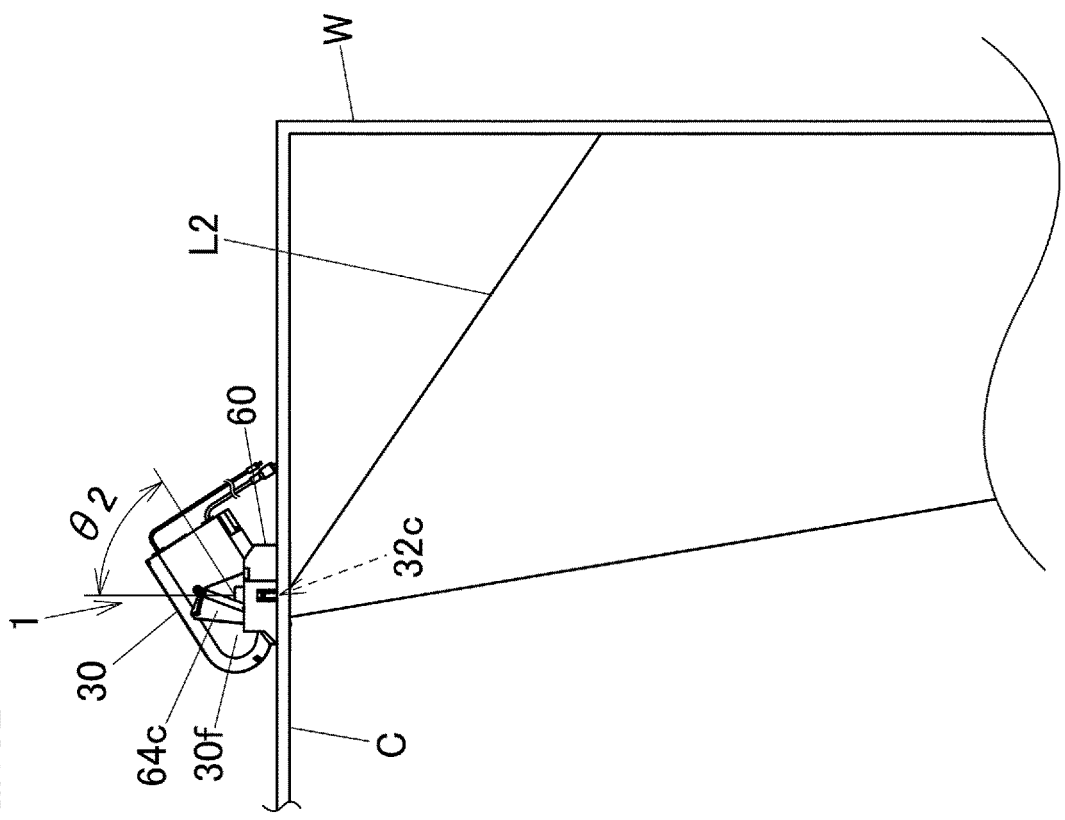
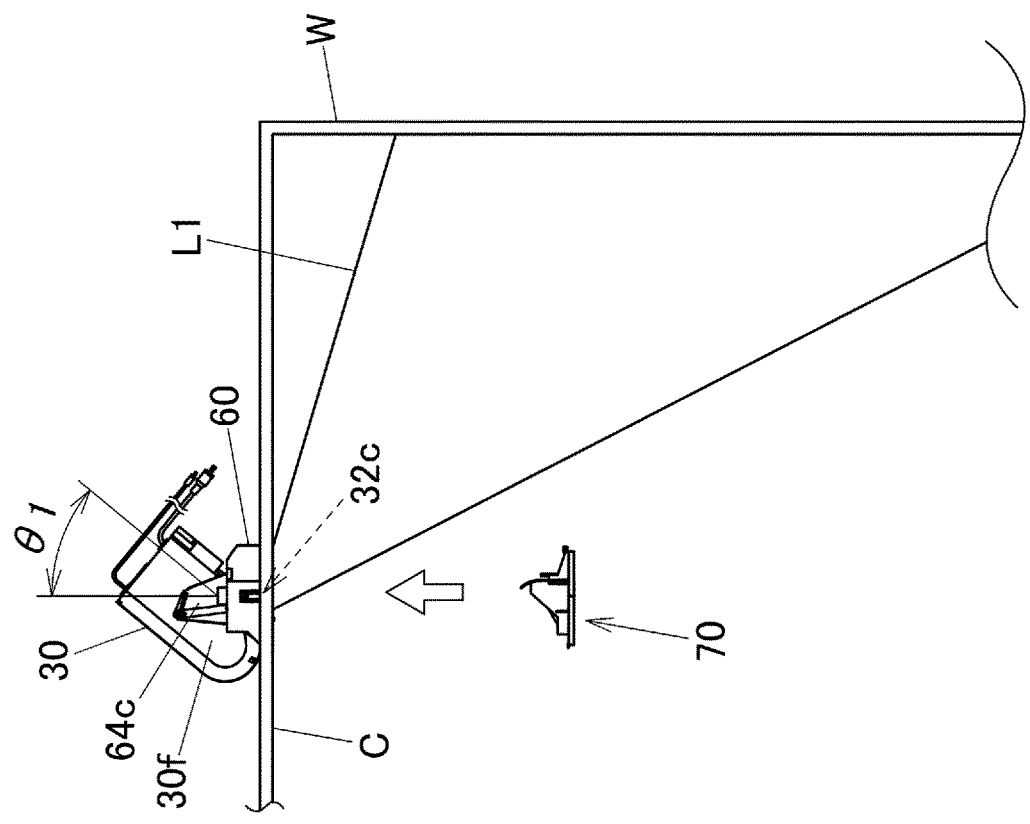

ENCASEMENT APPARATUS AND PROJECTION SYSTEM

CROSS-REFERENCE TO RELATED APPLICATION

This patent application is based upon and claims the benefit of priority under 35 USC 119 of Japanese Patent Application No. 2021-206585 filed on Dec. 21, 2021, the entire disclosure of which, including the specification, claims, drawings, and abstract, is incorporated herein by reference in its entirety.

BACKGROUND OF THE INVENTION

The present disclosure relates to an encasement apparatus and a projection system.

Description of the Related Art

Conventionally, there have been provided placement structures for placing a projector or the like from an opening provided in a ceiling or the like into a space defined inside (that is, on a back side of) the ceiling. For example, Japanese Patent Laid-Open No. 2010-164685 (JP-A-2010-164685) discloses a placement structure in which an opening is provided in a ceiling to transmit projected light, a slit is provided on each side of the ceiling, and a fan is provided in one of the slits. In this configuration, when the fan is driven to operate so as to discharge air from the one of the slits, almost the same amount of air as that of the air so discharged is caused to flow into a space on a back side of the ceiling, whereby a projection-type display apparatus situated between the silts can be cooled.

SUMMARY OF THE INVENTION

To solve the problem described above, according to an aspect of the present disclosure, there is provided an encasement apparatus including a case main body configured to freely encase equipment in an interior portion thereof, wherein the case main body has a first partition wall configured to divide the interior portion into a first isolated space and a second isolated space together with the equipment in such a state that the equipment is encased in the interior portion.

According to another aspect of the present disclosure, there is provided a projection system including the encasement apparatus described above and the equipment described above.

BRIEF DESCRIPTION OF THE DRAWINGS

FIGS. 13A, 13B are side views showing a procedure of placing the encasement case supported in the support frame inside an opening in a ceiling;

FIG. 15A is a side view showing a state in which projection is executed at a first projection angle from the placement structure of the encasement member placed inside the opening in the ceiling;

FIG. 15B is a side view showing a state in which projection is executed at a second projection angle from the placement structure of the encasement member placed inside the opening in the ceiling;

DETAILED DESCRIPTION OF THE PREFERRED EMBODIMENT

Figure 1:
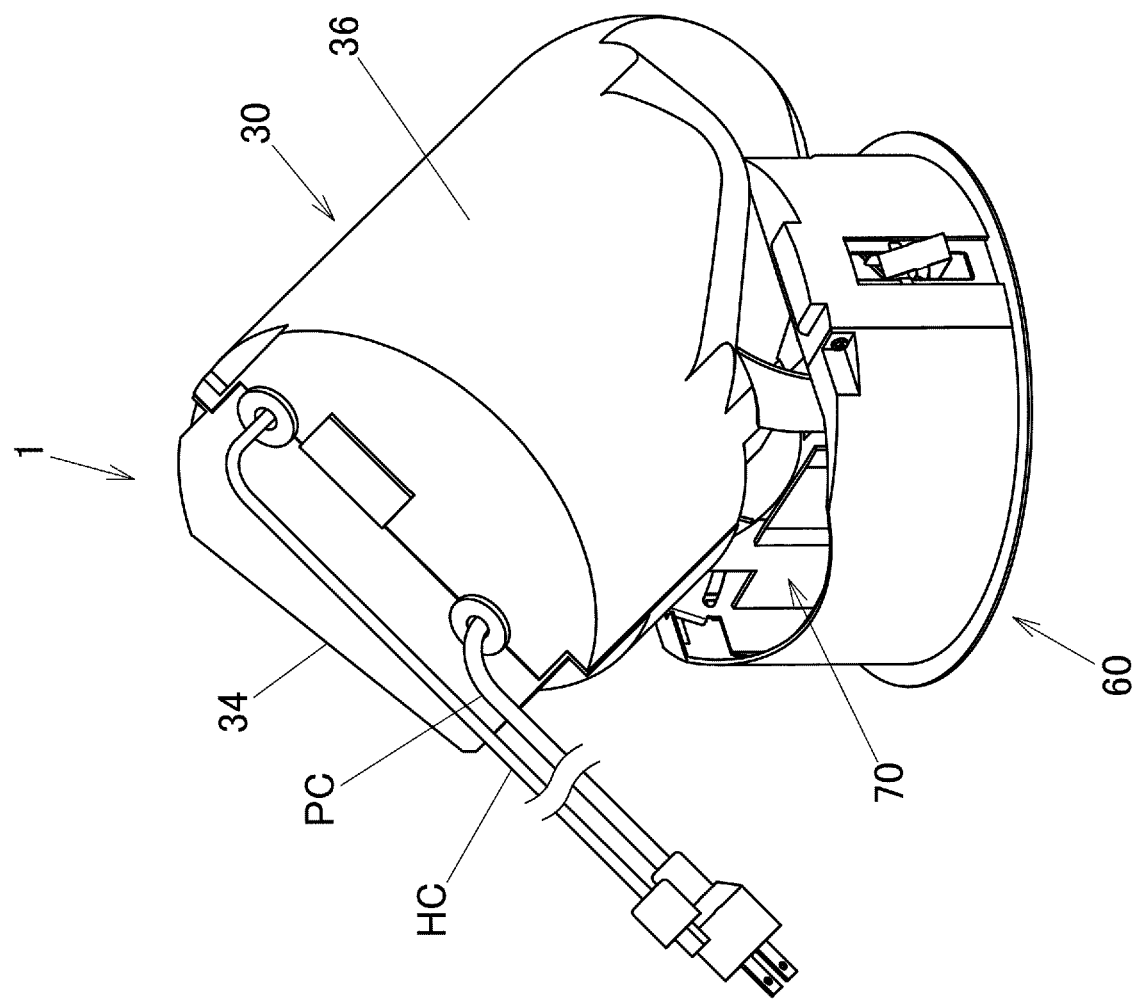
FIG. 1 is a perspective view showing an external appearance of a placement structure of an encasement member according to an embodiment of the present invention.

Hereinafter, referring to accompanying drawings, an embodiment of the present disclosure will be described. As shown in FIG. 1, a projection system 1 includes a projector 10 and an encasement apparatus, and the encasement apparatus includes an encasement case (a case main body) 30, a support frame (a support device) 60 configured to support the encasement case 30 and having an intake and discharge fan (a first blower and a second blower) 70. The projection system 1 is a structure for placing the projector 10 (refer to FIG. 2) on a back side of a ceiling material (a ceiling) or a wall material (a wall) in an embedding manner and executing projection. With the projection system 1, the encasement case 30 encasing the projector (an object) 10 in an interior portion thereof is placed from an opening CO (refer to FIGS.

13 and 14) provided in a ceiling material C in a space on a back side of the ceiling material CO (a space on an inner side of the opening CO). In addition, with the projection system 1, the encasement case 30 encasing the projector (an object) 10 in the interior portion thereof is placed from an opening, not shown, provided in a wall material W (refer to FIG. 15) in a space on an inner side of the wall material W (a space on an inner side of the opening). Here, FIG. 1 shows a state in which the encasement case 30 supported in the support frame 60 is tilted.

Figure 2:
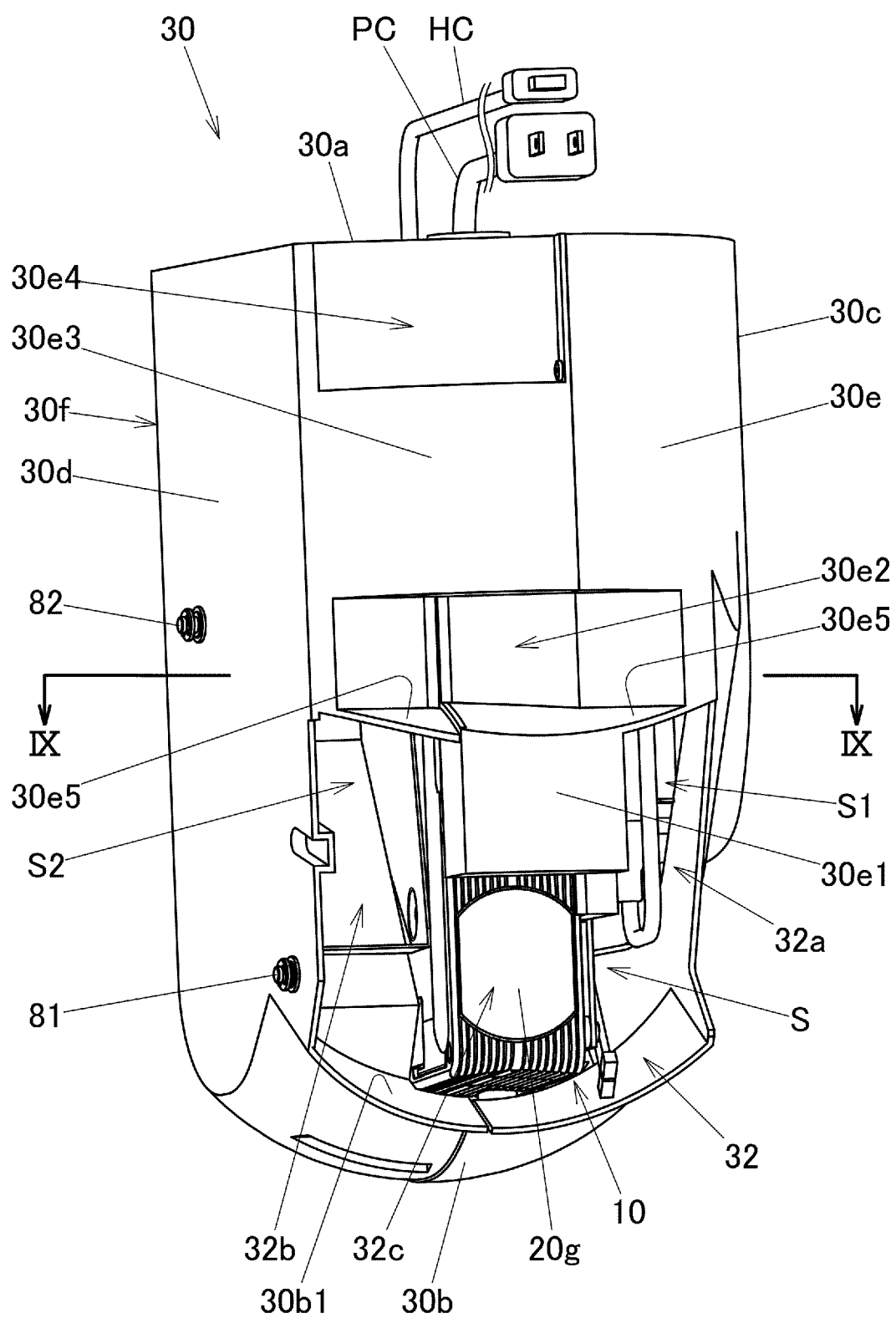
FIG. 2 is a perspective view of an encasement case according to the embodiment as seen from a front side thereof.

As shown in FIG. 2, the encasement case 30 is a vertically elongated, substantially box-shaped hollow member as a whole and has six wall portions (an upper wall portion 30a, a lower wall portion 30b, a left wall portion 30c, a right wall portion 30d, a front wall portion 30e, and a rear wall portion 30f). In the following description of the encasement case 30, a nearer side in FIG. 2 is referred to as a front side of the encasement case 30, and an opposite side is referred to as a rear side thereof. A rightward direction in FIG. 2 is referred to as a left side of the encasement case 30, and an opposite side is referred to as a right side thereof. The encasement case 30 encases the projector 10 in a space S provided in an interior portion thereof in such a manner as to cover a substantially whole area of the projector 10. The upper wall portion 30a of the encasement case 30 constitutes a flat surface, and the lower wall portion 30b thereof constitutes a downwardly protruding curved surface. In addition, the left wall portion 30c of the encasement case 30 constitutes a flat surface, and the right wall portion 30d thereof constitutes a curved surface which is outwardly protruding while bending in a substantially arcing shape like an outer circumferential surface of a circular cylinder whose longitudinal axis follows an up-down direction. Additionally, the rear wall surface 30f of the encasement case 30 constitutes an outwardly protruding curved surface.

A power cable PC, which controls and drives the projector 10 and the encasement case 30, and a video/voice transmission cable (an image input member) HC, which is connected with the projector 10, are pulled out upwards of the upper wall portion 30a. In addition, the left wall portion 30c is configured so that a lower portion thereof becomes thinner step by step as it extends downwards so as to avoid an interference with the support frame 60, which will be described later (refer to FIG. 1). Further, a first screw shaft 81 and a second screw shaft (an adjustment member) 82 are exposed from an external surface, constituting a flat surface, of the right wall portion 30d, and these first screw shaft 81 and second screw shaft 82 are used to attach an attachment plate (an attachment member) 44, which will be described later, to be disposed inside a space S to the right wall portion 30d. The first screw shaft 81 and the second screw shaft 82 are a shaft-like member including a portion where a screw groove is formed and a portion where no screw groove is formed. Of these two portions, the portion where no screw groove is formed is exposed from the external surface of the right wall portion 30d, and a washer is fitted on a distal end portion of the relevant portion which is so exposed.

A case opening portion 32, which is opened widely, is provided in a substantially lower half portion of the front wall portion 30e of the encasement case 30. The case opening portion 32 communicates with the space S inside the encasement case 30. The projector 10 is disposed vertically in a substantially central position of the encasement case 30 in a left-right direction thereof in the space S in such a manner that a projection port 20g is oriented towards the case opening portion 32. The space S is divided into two spaces, which are isolated from other spaces, by the projector 10 which is disposed vertically. Of these two spaces, a space situated closer to the left wall portion 30c is referred to as an intake space (a first isolated space) S1, and a space situated closer to the right wall portion 30d is referred to as a discharge space (a second isolated space) S2.

In addition, in the case opening portion 32, a left-hand side portion constitutes an intake-side opening portion (a first opening portion) 32a which communicates with the intake space S1, and a right-hand side portion constitutes a discharge-side opening portion (a second opening portion) 32b which communicates with the discharge space S2. Then, a substantially central position of the case opening portion 32 in the left-right direction thereof which lies between the intake-side opening portion 32a and the discharge-side opening portion 32b constitutes a projection opening portion 32c, which faces the projection port (a projection member) 20g of the projector 10. In other words, the projector 10 is encased within the space S in such a position that the projection port 20g faces the projection opening portion 32c in the substantially central position of the case opening portion 32 in the left-right direction thereof. A front end portion of the lower wall portion 30b makes up a lower opening edge of the case opening portion 32 and constitutes a lower rib portion 30b1 which extends while sloping down to expand outwardly forwards.

In the front wall portion 30e of the encasement case 30, recessed portions and protruding portions are provided on surfaces of portions excluding the case opening portion 32. A surface of a portion of the front wall portion 30e which is situated directly above the projection opening portion 32c constitutes a first protruding portion 30e1 whose surface protrudes outwards into a substantially arcing shape. A portion of the front wall portion 30e which is situated directly above the intake-side opening portion 32a and the discharge-side opening portion 32b constitutes a first recessed portion 30e2 which is recessed inwards to constitute a flat bottom. A portion of the front wall portion 30e which is situated above the first recessed portion 30e2 constitutes a second protruding portion 30e3 whose surface protrudes outwards into a substantially arcing shape. Additionally, a right upper end of the front wall portion 30e constitutes a second recessed portion 30e4 which is recessed inwards to constitute a flat bottom. Here, a portion of the first wall portion 30e which links the first protruding portion 30e1 with the first recessed portion 30e2 has an upper rib portion 30e5 which is formed at each of left and right sides of the relevant portion in such a manner as to extend while sloping down outwards from an inner end thereof.

Figure 3:
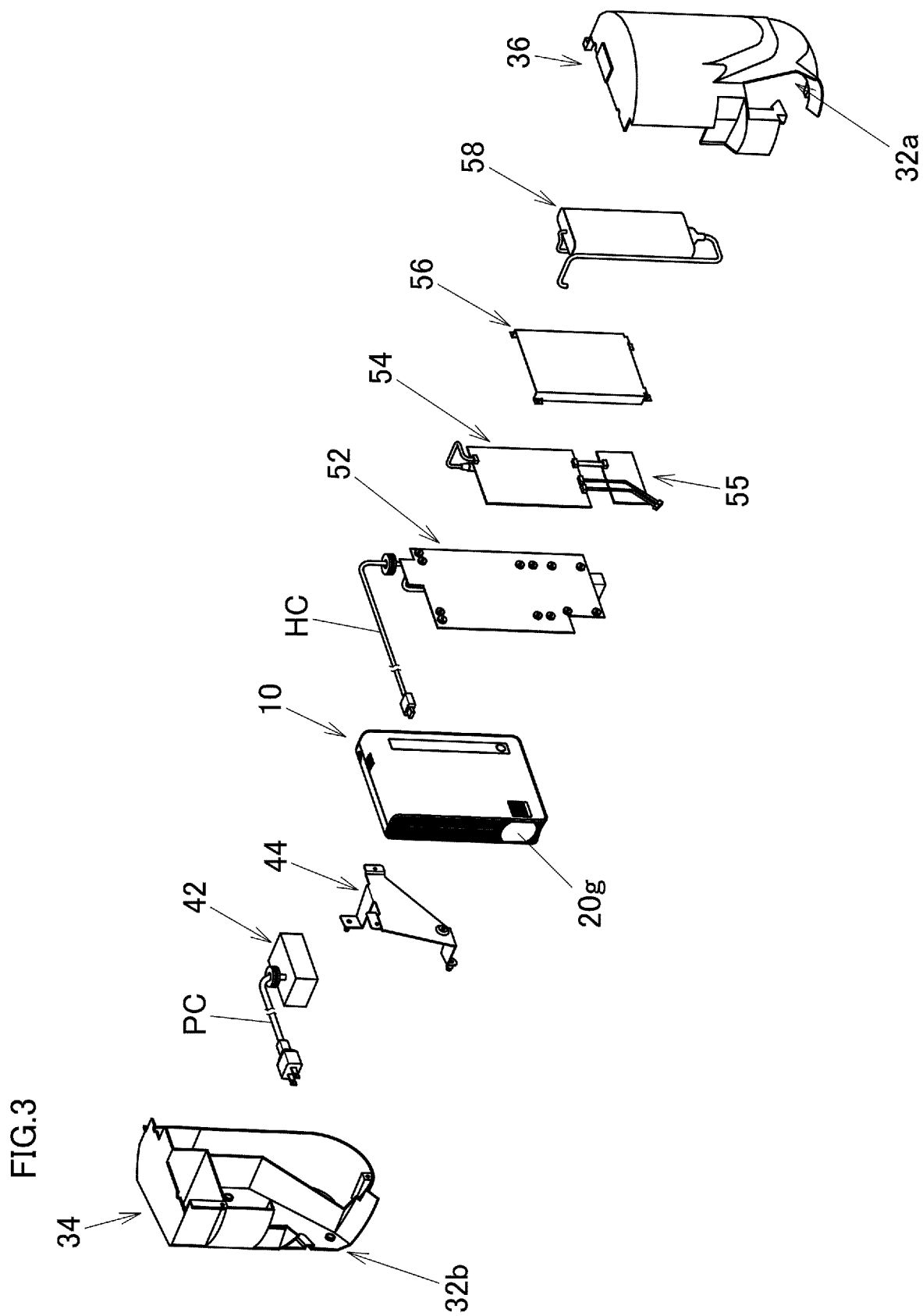
FIG. 3 is an exploded perspective view of the encasement case according to the embodiment.

As shown in FIG. 3, the encasement case 30 is a case having a space in an interior portion thereof and includes a discharge-side cover (a cover member) 34 which constitutes a substantially right half of the encasement case 30 and an intake-side cover (a cover member) 36 which constitutes a substantially left half of the encasement case 30. The discharge-side cover 34 and the intake-side cover (the cover member) 36 make up a case main body. The encasement case 30 encases various members including the projector 10 in a space defined between the discharge-side cover (the cover member) 34 and the intake-side cover (the cover member) 36. These two cover members are joined together using machine screws or the like. A terminal stand 42, the attachment plate 44, the projector 10, a base metal plate 52, a control board 54, a remote control board 55, a shield metal plate 56, an AC adaptor 58, and the like are encased in the interior portion of the encasement case 30. In these constituent members, the projector 10 is disposed in an inside of the discharge-side cover 34.

Figure 4:
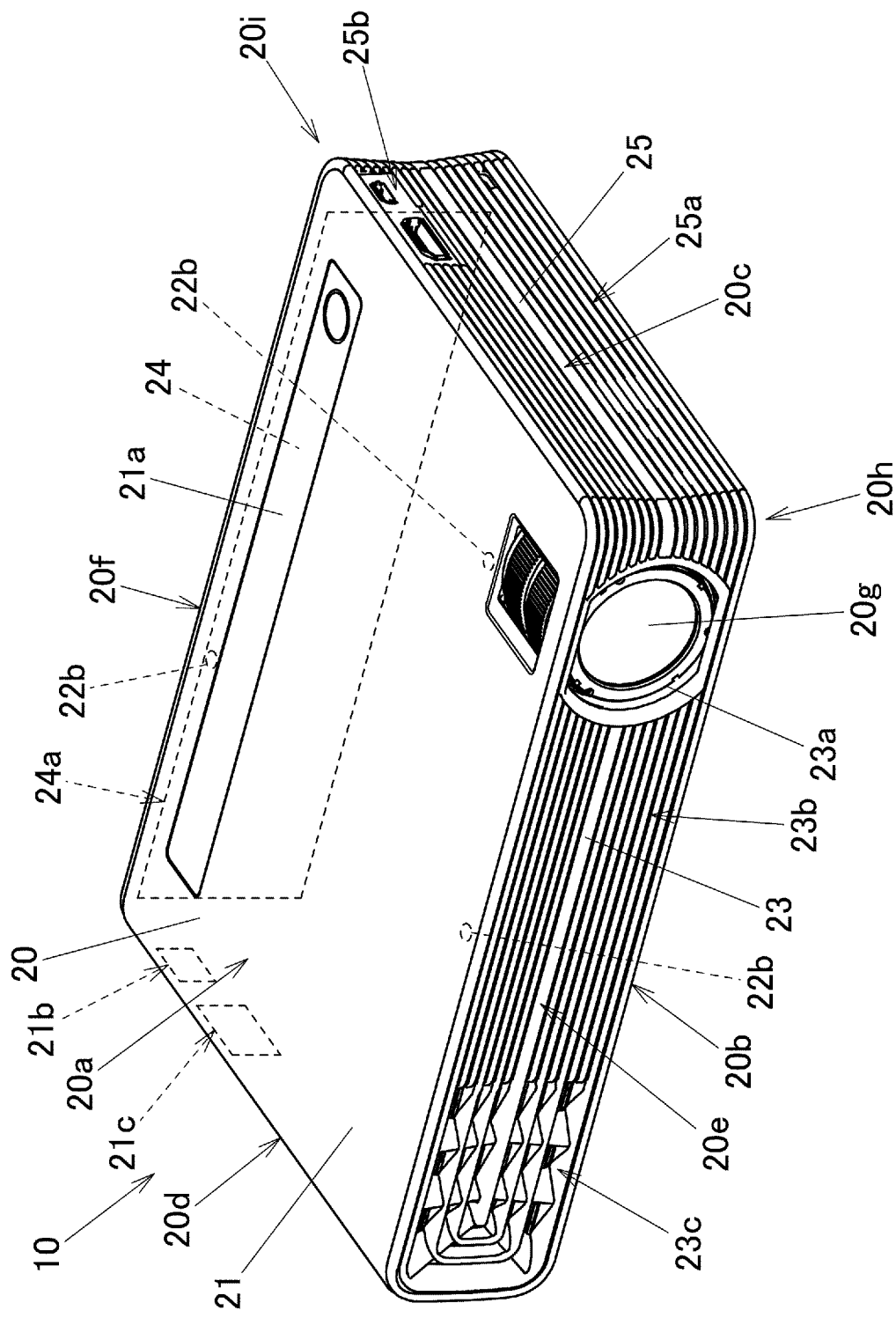
FIG. 4 is a perspective view of a projector, which is to be encased in the encasement case according to the embodiment.

FIG. 4 shows one example of the projector 10 which is encased in the encasement case 30. As shown in FIG. 4, the projector 10 includes a casing 20 which is formed into a substantially rectangular parallelepiped box shape whose longitudinal direction follows the left-right direction, the casing 20 having six surfaces (an upper surface 20a, a lower surface 20b, a left side surface 20c, a right side surface 20d, a front surface 20e, and a rear surface 20f). The projector 10 has the projection port 20g in the front surface 20e. The projector 10 emits projected light from the projection port 20g. In the following description of the projector 10, when left and right are referred to with respect to the projector 10, they denote a left-right direction with respect to a projection direction in which projected light is emitted from the projection port 20g. In addition, when front and rear are referred to with respect to the projector 10, they denote a front-rear direction with respect to a traveling direction of projected light from the projector 10. The casing 20 has an upper case 21 including the upper surface 20a and a part of the right side surface 20d and a lower case 22 including the lower surface 20b and a part of the right side surface 20d. The casing 20 has the front panel 23 at a front side, the rear panel 24 at a rear side, and the left panel 25 at a left side thereof. The front panel 23 extends as far as a left front corner portion 20h, and the left front corner portion 20h is formed into a rounded corner portion.

A projection port opening portion 23a for the projection port 20g, a first intake port 23b, and a first discharge port 23c are provided in the front panel 23. The rear panel 24 extends as far as a left rear corner portion 20i, and the left rear corner portion 20i is formed into a rounded corner portion. A second intake port 24a is provided over a substantially whole area of the rear panel 24. The left panel 25 is provided between the left front corner portion 20h and the left rear corner portion 20i to which the front panel 23 and the rear panel 24 extend, respectively. A third intake port 25a and a connection port 25b for an image input/output connector and the like are provided in the left panel 25.

A control panel 21a is provided on the upper surface 20a of the upper case 21 to execute setting of the projector 10, and the like. In addition, a power supply plug connection port 21b and a second discharge port 21c are provided in the right side surface 20d of the upper case 21 at a portion closer to the rear panel 24. Ceiling fixing screw holes 22b are provided in the lower surface 20b of the lower case 22 at three locations. In the projector 10 configured as described heretofore, the intake ports, from which outside air is taken in, are provided at the three locations (the first intake port 23b, the second intake port 24a, and the third intake port 25a), and the discharge ports, from which inside air within the projector 10 is discharged therefrom, are provided at the two locations (the first discharge port 23c, the second discharge port 21c).

Figures 5A, 5B:
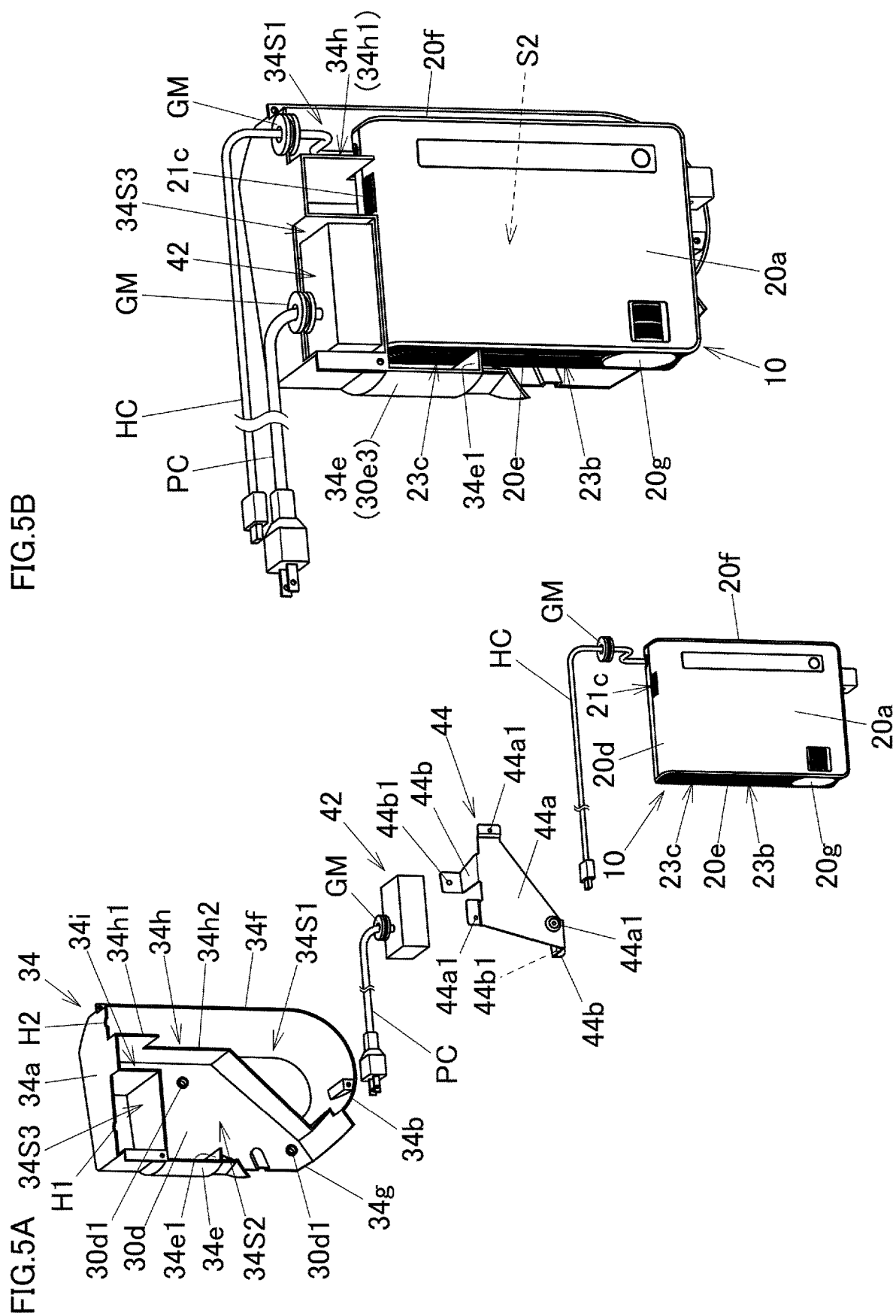
FIG. 5A is an exploded perspective view of a discharge-side cover and members which are to be disposed inside the discharge-side cover.
FIG. 5B is a perspective view of the discharge-side cover and the members which are now disposed inside the discharge-side cover.

Next, the configuration of the discharge-side cover 34 and those of the members encased in the encasement case 30 which are disposed inside the discharge-side cover 34 will be described. As shown in FIG. 5A, the discharge-side cover 34 includes portions of the encasement case 30 which are a portion making up the right wall portion 30d, a portion making up an area corresponding to a substantially right half of the upper wall portion 30a (hereinafter, referred to as a "discharge-side upper wall 34a"), a portion making up an area corresponding to a substantially right half of the lower wall portion 30b (hereinafter, referred to as a "discharge-side lower wall 34b"), a portion making up an area corresponding to a substantially right half of the front wall portion 30e (hereinafter, referred to as a "discharge-side front wall 34e"), and a portion making up an area corresponding to a substantially right half of the rear wall portion 30f (hereinafter, referred to as a "discharge-side rear wall 34f"). In addition, a cut-out (hereinafter, referred to as a "discharge-side cut-out 34g") making up a part of the projection opening portion 32c and the discharge-side opening portion 32b in the case opening portion 32 is formed in a lower portion of the discharge-side front wall 34e.

The terminal stand 42, the attachment plate 44, the projector 10, the power supply cable PC, and the video/voice transmission cable HC are disposed inside the discharge-side cover 34. A first partition wall 34h and a second partition wall 34i are provided inside the discharge-side cover 34 in such a manner as to rise from an inner surface of the right wall portion 30d so as to divide a space inside the discharge-side cover 34. The first partition wall 34h extends downwards from an inner surface of the discharge-side upper wall 34a, bends to the front halfway down the downward extension, and connects to a front portion of the discharge-side lower wall 34b. The second partition wall 34i extends downwards from the inner surface of the discharge-side upper wall 34a at a portion which is situated further forwards than the second partition wall 34h, then bends into a substantially L-shape, and connects to an upper portion of the discharge-side front wall 34e.

The inside of the discharge-side cover 34 is partitioned by the first partition wall 34h and the second partition wall 34i into a space which is surrounded by the first partition wall 34h, the discharge-side rear wall 34f, a part of the discharge-side upper wall 34a, and the discharge-side lower wall 34b (hereinafter, referred to as a "rear space (a first isolated space) 34S1"), a space which is surrounded by the first partition wall 34h, a part of the discharge-side front wall 34e, and the second partition wall 34i and which includes the discharge-side cut-out 34g (hereinafter, referred to as a "front space (a second isolated space) 34S2"), and a space which is surrounded by the second partition wall 34i, a part of the discharge-side upper wall 34a, and a part of the discharge-side front wall 34e (hereinafter, referred to as an "upper space (a third isolated space) 34S3"). The rear space 34S1 makes up a part of the intake space S1 described above, and the front space 34S2 makes up a part of the discharge space S2 described above.

The first partition wall 34h, which extends downwards from the inner surface of the discharge-side upper wall 34a, reduces a rising height thereof at which the first partition wall 34h rises from the right wall portion 30d somewhere down along the downward extension thereof. Specifically speaking, in the first partition wall 34h, a portion which overlaps the upper space 34S3 in the front-rear direction constitutes a high wall portion (a first wall portion) 34h1 having a first height, and a portion extending downwards from the high wall portion 34h1 constitutes a low wall portion (a second wall portion) 34h2 having a second height which is smaller in rising height than the high wall portion 34h1. A rising height at which the high wall portion 34h1 rises higher than the low wall portion 34h2 is made substantially equal to a thickness of the projector 10, which is encased in the encasement case 30. Additionally, a rising height of the second partition wall 34i is made equal to the rising height of the high wall portion 34h1 of the first partition wall 34h, that is, the first height.

The terminal stand 42 has a box-like shape having a size which enables the terminal stand 42 to be encased in the upper space 34S3, and the terminal stand 42 is encased within the upper space 34S3 as relay equipment in an electrical system of the projection system 1. A signal wire (an input/output wire material) of the power supply cable PC or the like is connected to one of terminals of the terminal stand 42 and is passed through a first cable hole portion H1 provided in the discharge-side upper wall 34a via grommet GM to thereby be pulled out upwards of the discharge-side upper wall 34a. The plug at a distal end of the power supply cable PC is connected to a plug socket of 100V. Additionally, the terminal stand 42 is electrically connected with a first connection cable (an input/output wire material), which will be described later.

The attachment plate 44 is a member for fixedly attaching the projector 10 to an inner side of the discharge-side cover 34, and is attached to the inner side of the discharge-side cover 34 together with the projector 10 in such a state that the attachment plate 44 is attached to the projector 10. The attachment plate 44 is a sheet metal member and has a substantially triangular plate-shaped portion 44a and two leg portions 44b which extend substantially at right angles from the plate-shaped portion 44a. A screw hole 44a1 is provided in the vicinity of each of three corner portions of the substantially triangular plate-shaped portion 44a. The attachment plate 44 has the leg portions 44b which are projecting portions 44b which are individually provided in the vicinity of both ends of a longest side of the triangular shape on a circumferential edge portion of the plate-shaped portion 44a and which extend or project as described above by being bent to an opposite side to a side where the attachment plate 44 is attached to the projector 10. A screw attachment portion 44b1 is provided further at a distal end of each projecting portion 44b in such a manner that the distal end constitutes a plane which is substantially parallel to a planar direction of the plate-shaped portion 44a. As will be described later, attachment holes for thread screwing the first screw shaft 81 and the second screw shaft 82 are individually provided in the screw attachment portions 44b1. The screw holes 44a1 are disposed in such a manner as to match in position the ceiling fixing screw holes 22b which are provided in the lower surface 20b of the projector 10 which is encased in the encasement case 30. Additionally, a length of the leg portion 44b is made substantially equal to the rising height of the low wall portion 34h2 of the first partition wall 34h.

Attachment holes 30d1 for attaching the attachment plate 44 to the inner side of the discharge-side cover 34 are provided in the right wall portion 30d in positions which correspond to the portions where the first screw shaft 81 and the second screw shaft 82 are exposed. The attachment plate 44 is fixedly attached to the discharge-side cover 34 inside the front space 34S2 in the discharge-side cover 34 by superposing the screw attachment holes in the screw attachment portions 44b1 provided on the corresponding leg portions 44b on the attachment holes 30d1 provided in the right wall portion 30d and being thread screwed by the first screw shaft 81 and the second screw shaft 82 from an external surface side of the right wall portion 30d. A plate surface of the plate-shaped portion 44a of the attachment plate 44 which is now attached to the right wall portion 30d is positioned on substantially the same plane as a rising distal end portion 34h2a (refer to FIG. 9) of the low wall portion 34h2 of the first partition wall 34h.

As shown in FIG. 5A, the projector 10 is attached in advance to the attachment plate 44 vertically with the right side surface 20d oriented upwards and the projection port 20g in the front surface 20e oriented to the front and is then attached to the inner side of the discharge-side cover 34 via the attachment plate 44. In this state, the screw holes 44a1 provided in the plate-shaped portion 44a of the attachment plate 44 are superposed on the ceiling fixing screw holes 22b provided in the lower surface 20b, and the projector 10 is screwed in place from the side of the attachment plate 44, whereby the projector 10 is attached to the attachment plate 44 (refer to FIG. 8). As a result, a light axis LC (refer to FIG. 13A) of projected light emitted from the projector 10 follows the surface of the plate-shaped portion 44a of the attachment plate 44, and axial directions of the first screw shaft 81 and the second screw shaft 82 intersect the light axis LC of projected light emitted from the projector 10 at right angles.

As a result of the attachment plate 44, to which the projector 10 is now attached, being attached to the right wall portion 30d, the projector 10 is disposed in such a manner as to extend from the rear space 34S1 to the front space 34S2 inside the discharge-side cover 34 in a posture in which the lower surface 20b thereof is oriented towards the right wall portion 30d (the upper surface 20a is oriented towards the intake-side cover 36), the right side surface 20e thereof is oriented towards the discharge-side upper wall 34a (the left side surface 20c is oriented towards the discharge-side lower wall 34b), and the front surface 20e thereof is oriented towards the discharge-side front wall 34e (the rear surface 20f is oriented towards the discharge-side rear wall 34f). In this posture, the projection port (the projection member) 20g of the projector 10 which projects an image is exposed to the front from the discharge-side cut-out 34g in the discharge-side front wall 34e. The projection port 20g of the projector 10 is formed of a transparent material such as glass.

Here, a lower end of a portion of the discharge-side front wall 34e which makes up the second protruding portion 30e3 of the encasement case 30 bends substantially at right angles towards the front space 34S2 so as to connect a difference in level or height between the second protruding portion 30e3 and the first recessed portion 30e2 of the encasement case 30 (hereinafter, this bending wall portion is referred to as an "abutment wall 34e1"). The projector 10, which is now attached to the right wall portion 30d via the attachment plate 44, is disposed inside the discharge-side cover 34 in the posture described above in which the lower surface 20b thereof is in indirect abutment with the rising distal end portion 34h2a of the low wall portion 34h2 of the first partition wall 34h via the attachment plate 44, the right side surface 20d thereof is in abutment with a lower end of the high wall portion 34h1 and a lower surface area of the second partition wall 34i, and the front surface 20e thereof is in abutment with the abutment wall 34e1 (refer to FIG. 5B). Here, the description of "in indirect abutment" made above means a situation in which another member is disposed between the rising distal end portion 34h2a of the low wall portion 34h2 and the projector 10, whereby the projector 10 is disposed in the vicinity of the rising distal end portion 34h2a via the other member. A configuration may be adopted in which the projector 10 is in direct abutment with the rising distal end portion 34h2a of the low wall portion 34h2.

As shown in FIG. 5B, as a result of the projector 10 being disposed inside the discharge-side cover as described above, the front space 34S2 is covered by the projector 10, whereby the discharge space S2 including the front space 34S2 is formed. Then, the first discharge port 23c and the second discharge port 21c of the projector 10 are exposed in the discharge space S2 on an inner side of the second protruding portion 30e3 and an inner side of the discharge-side upper wall 34a, respectively, while being disconnected from the intake ports 23b, 24a, 25a of the projector 10. In addition, a state results in which the front space 34S2 is positioned between the right wall portion 30d and the projector 10, whereby the discharge-side opening portion 32b, which is surrounded by the discharge-side cut-out 34g and the casing 20 of the projector 10, is formed in front of the discharge-side cover 34.

Figure 8:
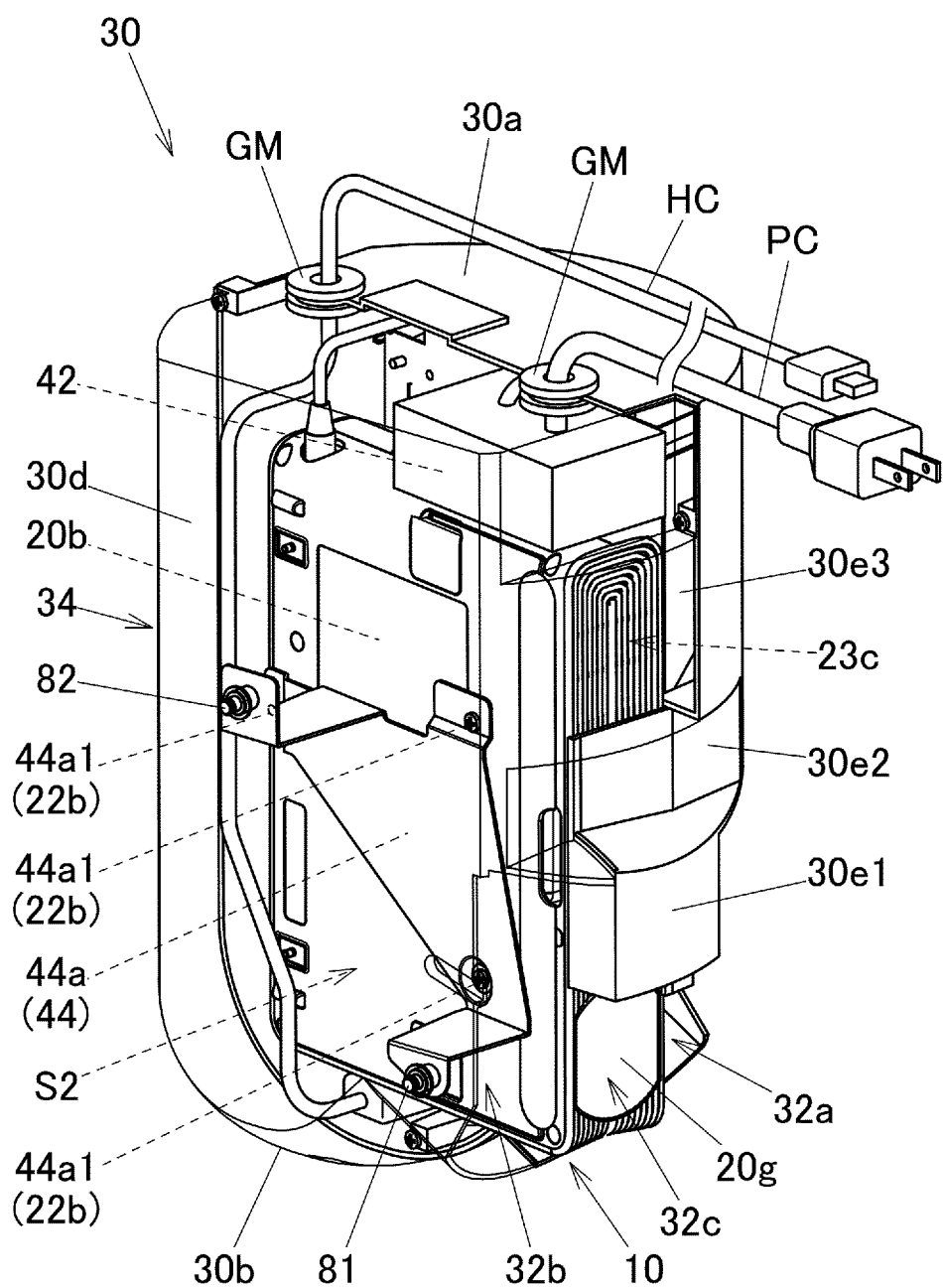
FIG. 8 is a see-through perspective view of the encasement case as seen from a right side surface thereof.

The discharge-side opening portion 32b, which is formed in front of the discharge-side cover 34, communicates with the discharge space S2. As shown in FIGS. 5B and 8, a flow path extending from the first discharge port 23c to the discharge-side opening portion 32b by way of the discharge space S2 and a flow path extending from the second discharge port 21c to the discharge-side opening portion 32b by way of the discharge space S2 are formed between the right wall portion 30d and the projector 10. That is, the discharge space S2 constitutes a flow path along which air discharged from the projector 10 flows. To describe this more specifically, air discharged from the first discharge port 23c and the second discharged port 21c of the projector 10 reaches the discharge-side opening portion 32b by way of the discharge space S2 and then flows out of the discharge-side cover 34 (the encasement case 30).

On the other hand, as a result of the projector 10 being disposed inside the discharge-side cover 34 as described above, a situation results in which the rear space 34S1 is positioned between the right wall portion 30d and a portion of the projector 10 which lies closer to the rear surface 20f. The video/voice transmission cable HC, which is connected to the connection port 25b of the projector 10, is passed into the rear space 34S1, is then passed through a second cable hole portion (an image input hole portion) H2 via a grommet GM, and is eventually pulled out of the encasement case 30 from above the discharge-side upper wall 34a.

Figure 6B:
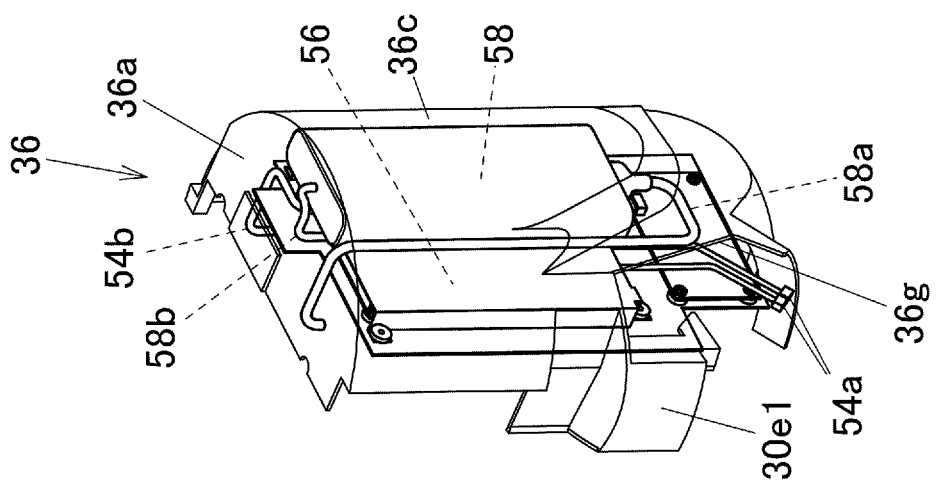
FIG. 6B is a perspective view of the intake-side cover and the member which are now disposed inside the intake-side cover.
Figure 6A:
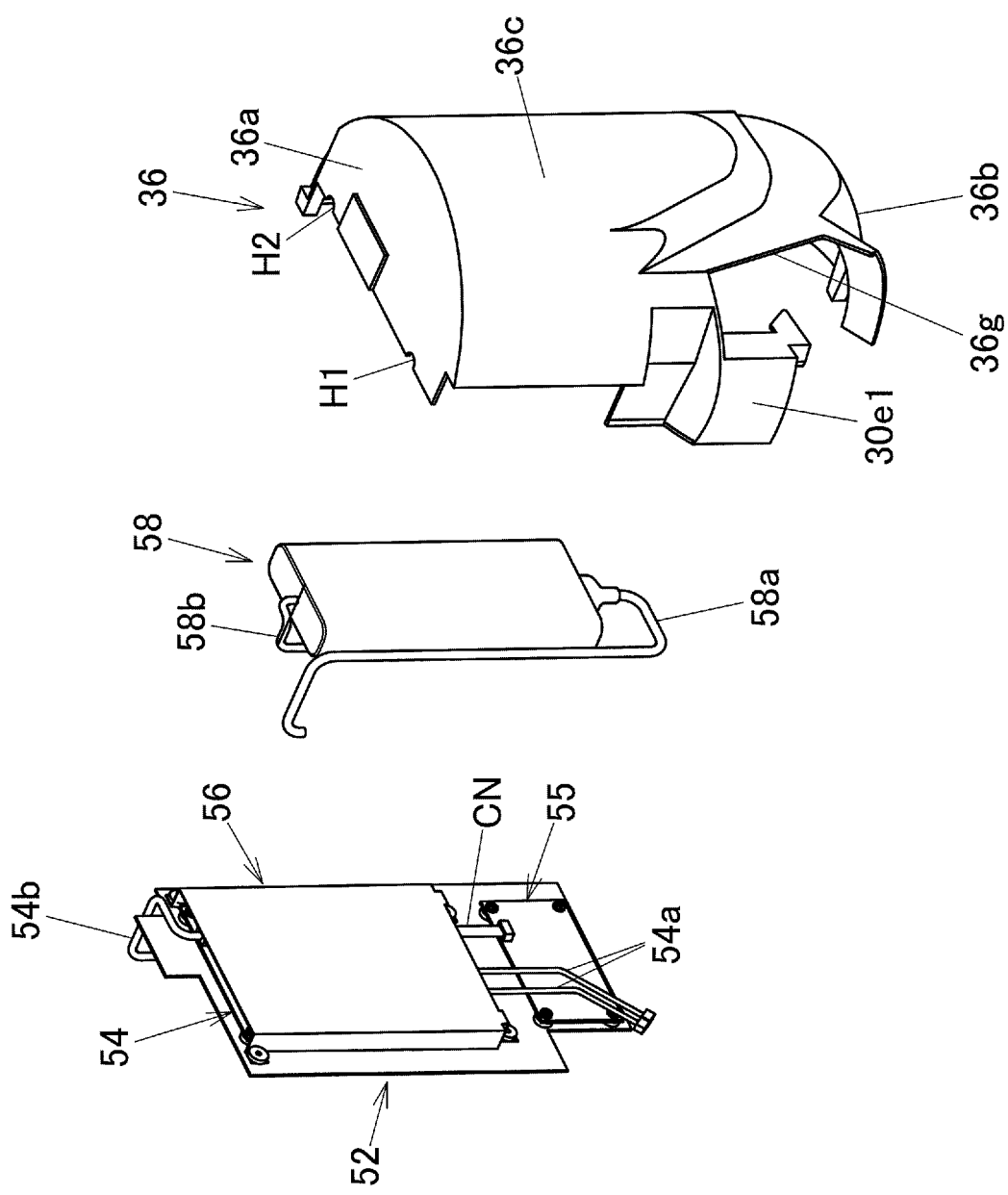
FIG. 6A is an exploded perspective view of an intake-side cover and members which are to be disposed inside the intake-side cover.

Next, the configuration of the intake-side cover 36 and those of the members encased in the encasement case 30 which are disposed inside the intake-side cover 36 will be described. As shown in FIG. 6A, the intake-side cover 36 has a substantially semi-cylindrical shape and includes portions of the encasement case 30 which are a portion making up an area corresponding to a substantially left half of the upper wall portion 30a (hereinafter, referred to as an "intake-side upper wall 36a"), a portion making up an area corresponding to a substantially left half of the lower wall portion 30b (hereinafter, referred to as an "intake-side lower wall 36b"), and a portion making up the left wall portion 30c, an area corresponding to a substantially left half of the front wall portion 30e, and an area corresponding to a substantially left half of the rear wall portion 30f (hereinafter, referred to as an "intake-side side wall 36c"). In addition, a cut-out (hereinafter, referred to as an "intake-side cut-out 36g") making up a part of the projection opening portion 32c and the intake-side opening portion 32a in the case opening portion 32 is formed in a front lower portion of the intake-side side wall 36c. The intake-side side wall 36c has a portion making up the first protruding portion 30e1 of the encasement case 30 at a front portion thereof.

An inside of the intake cover 36 defines therein a space free from partitions, and the base metal plate 52, the control board 54, the remote control board 55, the shield metal plate 56, and the AC adaptor (an accessory member) 58 are disposed in the space so defined. The base metal plate 52 is a plate-shaped sheet metal member and functions as a member for attaching the control board 54 and the remote control board 55 to the intake-side cover 36. A plate surface of the base metal plate 52 is supported on the upper surface 20a of the projector 10, which is attached to the discharge-side cover 34, by being fastened thereto using machine screws. The shield metal plate 56 is a plate-shaped sheet metal member and functions as a member for shielding the control board 54. In addition, the shield metal plate 56 may also shield at least a part of the remote control board 55.

The control board 54 is a board for controlling the projector 10 and the remote control board 55 which are encased in the encasement case 30, as well as the intake and discharge fan 70. The control board 54 is electrically connected with the remote control board 55 via a connector CN. Two wires 54a for individually driving an intake fan F1 (a first blower) and a discharge fan F2 (a second blower) of the intake and discharge fan 70, which will be described later, and a power supply cable 54b which is connected with a second connection cable 58b of the AC adaptor 58, which will be described later, extend from the control board 54. The remote control board 55 has a remote control signal reception portion (an infrared IR diode or the like) for receiving an infrared signal transmitted from a remote controller, not shown, in response to an operation of a button on the remote controller and functions as a board for transmitting a signal received by the remote control signal reception portion to the control board 54 by way of the connector CN. Then, the control board 54 transmits the signal transmitted thereto from the remote control board 55 to the projector 10 using a wiring or the like, not shown, to thereby control the projector 10. As a result, the signal received from the remote controller can easily be caused to be received by the projector 10 disposed inside the encasement case 30. A button component, which is configured to active the same operation as an operation activated when a MENUE key disposed on the control panel 21 of the projector 10 is depressed, may be disposed on the remote control board 55. As this occurs, a circuit on the remote control board 55 or the control board 54 is configured to send the same control signal as a control signal that is sent when the MENU key on the control panel 21 is depressed, when the button component disposed on the remote control board 55 is depressed. The button component disposed on the remote control board 55 is not limited to a MENU button, and hence, multiple button components may be disposed. As a result, a button operation can easily be performed on the projector 10, which is disposed inside the encasement case 30. The control board 54 and the remote control board 55 are attached to a plate surface of the base metal plate 52, and the shield metal plate 56 is attached to the base metal plate 52 from thereabove, whereby the control board 54 is surrounded by the shield metal plate 56 to thereby be shielded from an exterior portion.

A first connection cable 58a (an AC input) and a second connection cable 58b (a DC output) extend individually from the AC adaptor 58. An alternating-current voltage is input into the AC adaptor 58 by electrically connecting the first connection cable 58a with the other terminal on the terminal stand 42, and a DC output from the AC adaptor 58 is supplied to the control board 54 and the projector 10 by way of the second connection cable 58b. As a result, an operation voltage is supplied to the projector 10, the control board 54, and the remote control board 55 which are encased in the encasement case 30, as well as the intake and discharge fan 70 so as to activate those devices to operate. The base metal plate 52, the control board 54, the remote control board 55, the shield metal plate 56, and the AC adaptor 58 are disposed inside the intake-side cover 36 in such a state that the base metal plate 52 is supported by the projector 10 and the like and that the various types of cables are connected with the projector 10 and the terminal stand 42 (refer to FIGS. 6B, 7).

Figure 7:
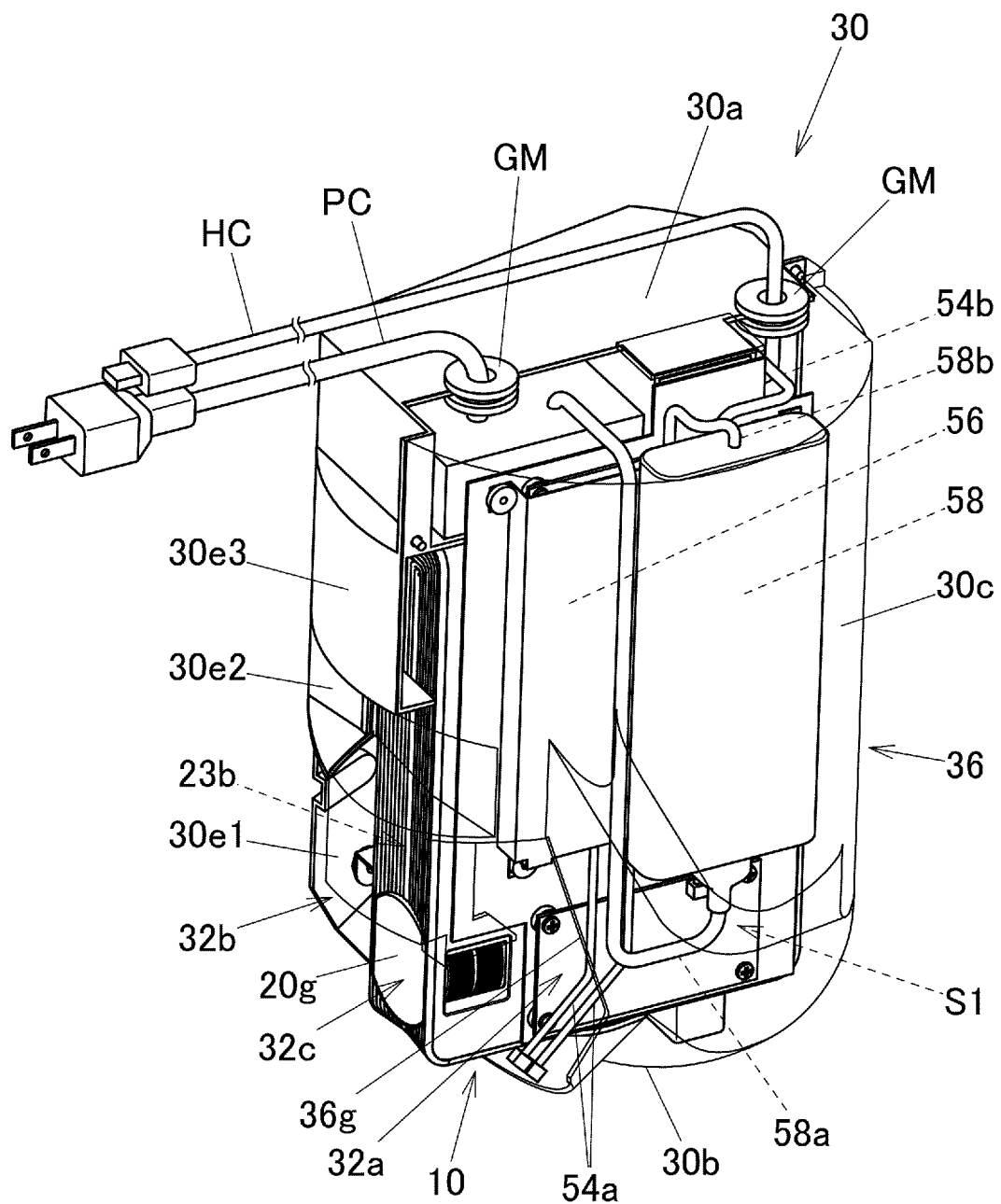
FIG. 7 is a see-through perspective view of the encasement case as seen from a left side surface thereof.

As shown in FIG. 7, the intake-side cover 36 is joined to the discharge-side cover 34 with the constituent members encased in the encasement case 30, whereby a space defined between the left wall portion 30c and the projector 10 communicates with the rear space 34S1 to thereby form the intake-space S1, and the intake-side opening portion 32a, which is surrounded by the intake-side cut-out 36g and the casing 20 of the projector 10, is formed in front of the intake-side cover 36. The intake-side opening portion 32a formed in front of the intake-side cover 36 communicates with the intake space S1.

Then, the first intake port 23b, the second intake port 24a, and the third intake port 25a of the projector 10 are exposed inside the intake space S1 on an inner side of the first protruding portion 30e1, an inner side of the rear wall portion 30f, and an inner side of the lower wall portion 30b, respectively, while being disconnected from the discharge ports 23c, 21c of the projector 10. A space defined on the inner side of the first protruding portion 30e1 communicates only with the intake space S1, whereas the other portions are closed as a result of a wall extending from the inner side of the first protruding portion 30e1 being brought into abutment with the projector 10 (refer to FIGS. 7 and 8).

Figure 9:
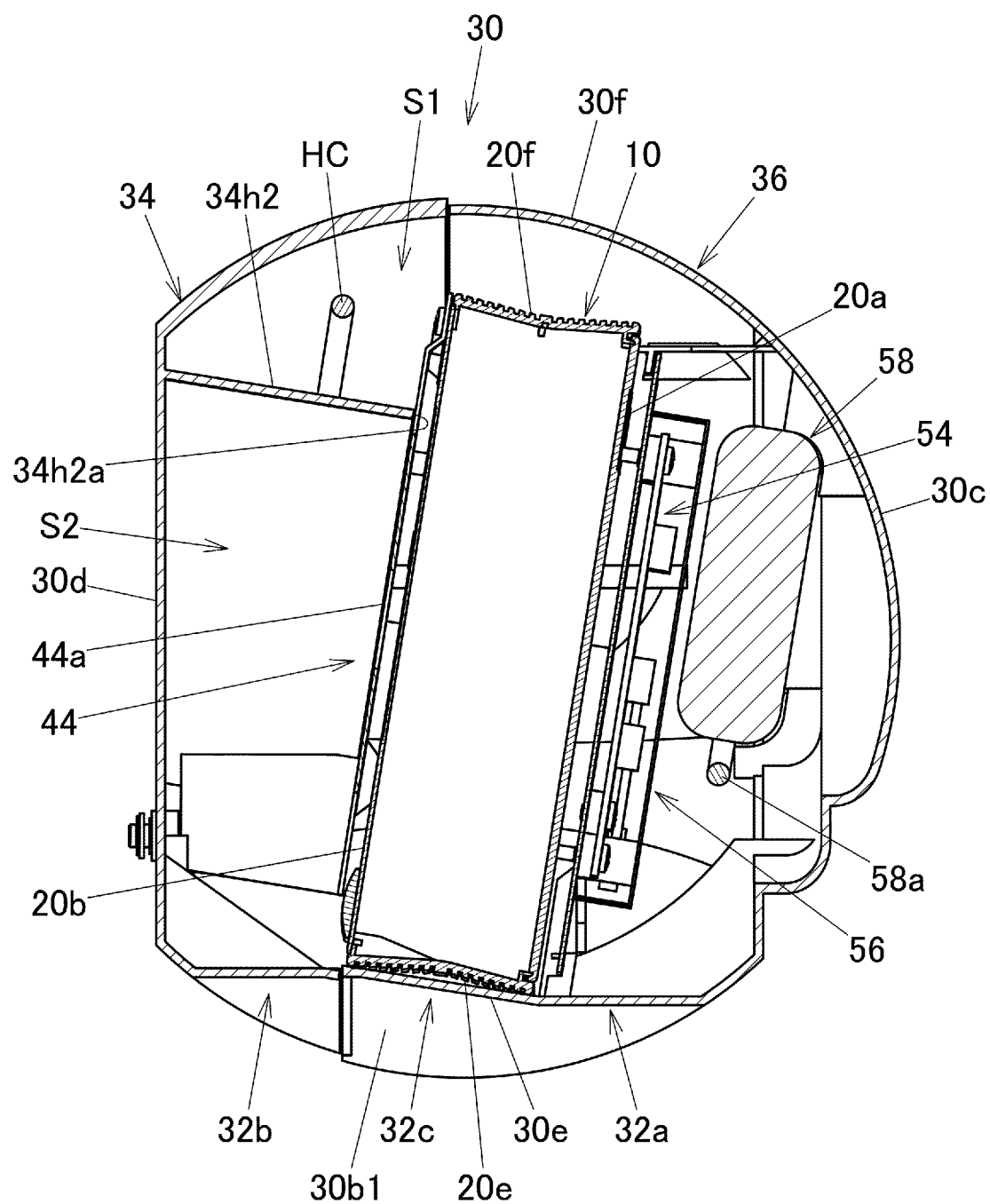
FIG. 9 is a cross-sectional view of the encasement case, which is a cross sectional view showing a cross-sectional configuration of the encasement case taken along a line IX-IX in FIG. 2 (with an internal configuration of the projector omitted from illustration)

As a result, a flow path extending from the intake-side opening portion 32a to the first intake port 23b by way of the intake space S1, a flow path extending from the intake-side opening portion 32a to the second intake port 24a by way of the intake space S1, and a flow path extending from the intake-side opening portion 32a to the third intake port 25a byway of the intake space S1 are formed between the left wall portion 30c and the projector 10. That is, the intake space S1 functions as a flow path along which intake air flows to the projector 10. As shown in FIG. 9, the intake space S1 and the discharge space S2 are isolated from each other via the projector 10 as a result of the intake-side cover 36 being joined to the discharge-side cover 34. To describe this more specifically, air flowing from an outside of the encasement case 30 towards the intake-side opening portion 32a flows from the intake-side opening portion 32a and reaches the first intake port 23b, the second intake port 24a, and the third intake port 25a by way of the intake space S1.

In addition, as a result of the intake-side cover 36 being joined to the discharge-side cover 34, the intake-side opening portion 32a and the discharge-side opening portion 32b are joined together, whereby the case opening portion 32 is formed. Then, the projection opening portion 32c, from which the projection port 20g of the projector 10 is exposed, is formed between the intake-side opening portion 32a and the discharge-side opening portion 32b below the first protruding portion 30e1 of the front wall portion 30e. Here, a situation results in which the two wires 54a extending from the control board 54 described above are pulled out of the intake-side opening portion 32a to the outside of the encasement case 30 (refer to FIG. 7).

Figure 10:
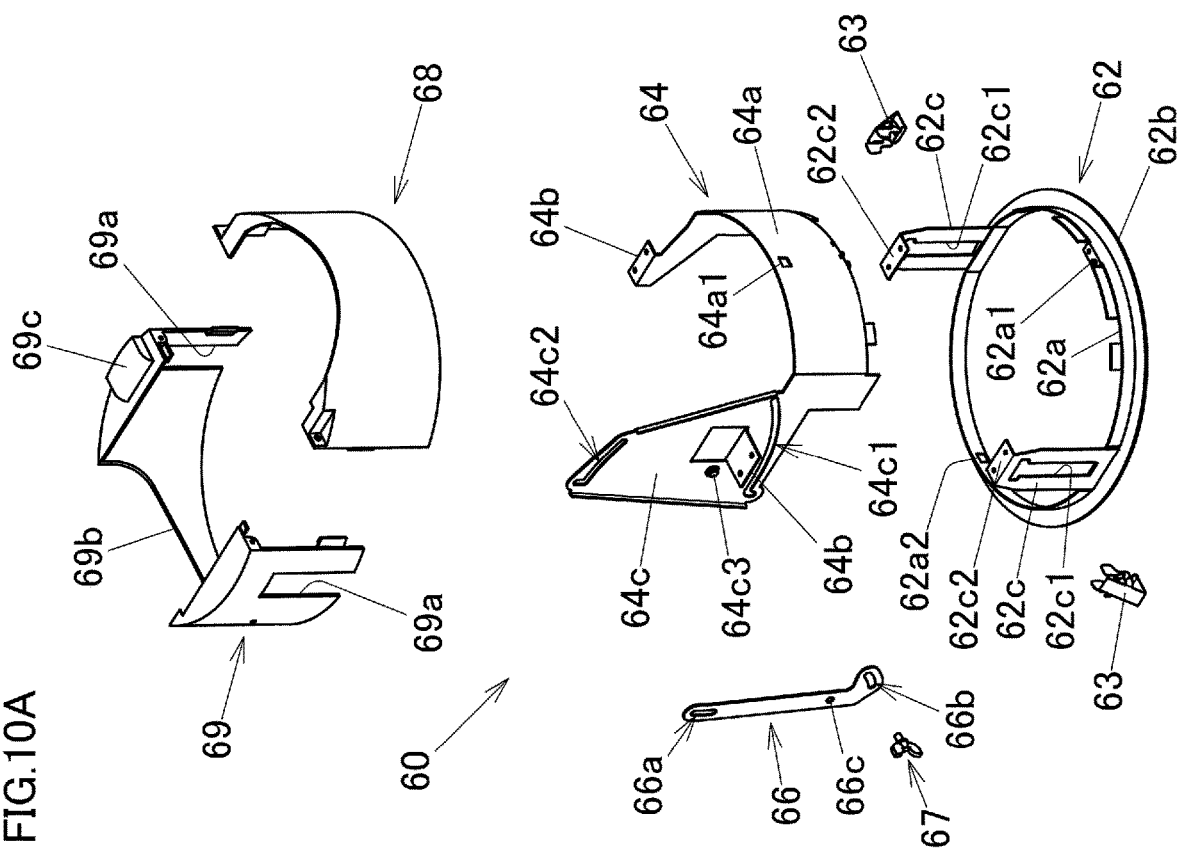
FIG. 10A is an exploded perspective view of a support frame.
FIG. 10B is a partially see-through perspective view of the support frame.
Figure 14B:
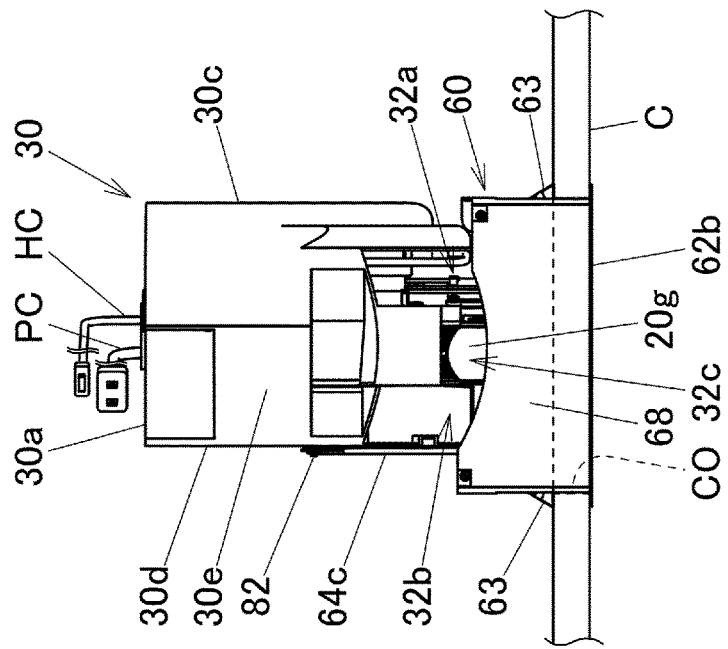
FIGS. 14A, 14B are front views showing the procedure of placing the encasement case supported in the support frame inside the opening in the ceiling.

Next, configurations of constituent members, excluding the intake and discharge fan 70, of the support frame 60 will be described. The support frame 60 is a substantially annular member which is attached to the circular opening CO (refer to FIGS. 13 and 14) provided in a ceiling C in such a state that the support frame 60 supports the encasement case 30 therein. The support frame 60 is formed into a metallic member which is strong enough to support the encasement case 30. The encasement apparatus includes a posture adjusting mechanism for changing the orientation or posture of the encasement case 30 with respect to the support frame 60. As shown in FIG. 10A, the support frame 60 is a member having a substantially annular shape and has an annular portion 62, two stopper members 63, a support plate portion (a fixing member) 64, a link member 66 which is fixed to the support plate portion 64, a butterfly screw 67, a front cover portion 68, and a rear cover portion 69. The attachment plate 44, the first screw shaft 81 and the second screw shaft 82 function as the posture adjustment mechanism in cooperation with the support plate portion 64, the link member 66, and the butterfly screw 67. In the following description of the support frame 60, the support frame 60 will be described based on the understanding that a right downward direction in FIGS. 10A, 10B denotes the front of the support frame 60 and the constituent members of the support frame 60, while an opposite direction or side denotes the rear thereof, and that a left downward direction in FIGS. 10A, 10B denotes the right of the support frame 60 and the constituent members of the support frame 60, while an opposite direction or side denotes the left thereof.

The annular portion 62 has an annular frame portion 62a, an annular flange portion 62b which protrudes from a lower end of the annular frame portion 62a into a flange-like shape, and rising portions 62c which rise from two locations on the annular frame portion 62a while facing each other across a center of the annular frame portion 62a. The flange portion 62b of the annular portion 62 has a size which is larger one size than the opening portion CO in the ceiling C, which constitutes an attaching target. The annular frame portion 62a is an annular frame member having a size matching that of the opening portion CO (refer to FIG. 13) in the ceiling C, which constitutes the attaching target. A fan attachment screw hole 62a1 and a fan attachment screw hole 62a2 for attaching the intake and discharge fan 70, which will be described later, are provided in the annular frame portion 62a at a front central portion and a rear central portion thereof, respectively. Each rising portion 62c rises into a plate-like shape from the annular frame portion 62a in such a manner that a plate surface thereof is oriented towards the center of the annular frame portion 62a, and a hole portion 62c1, which is opened into a rectangular shape which is elongated in the up-down direction, is provided in the plate surface thereof. A lower attachment portion 62c2 is provided at a rising distal end portion of each rising portion 62c, and two screw holes are provided in the lower attachment portion 62c2 in such a manner as to be opened in the up-down direction and aligned side by side in the front-rear direction.

Each stopper member 63 is attached in place in the corresponding hole portion 62c1 provided in each rising portion 62c of the annular portion 62. Each stopper member 63 is a leaf spring member which is bent substantially into a V-shape and is brought into engagement with the corresponding hole portion 62c1 of the rising portion 62c in such a posture that a bent portion projects to the outside of the rising portion 62c. An outer surface of each stopper member 63 constitutes a sloping surface which slopes outwardly downwards from a top to a bottom thereof and projects further outwards than the annular frame portion 62a of the annular portion 62. Minute irregularities, not shown, are formed vertically on an inner side of each hole portion 62c1. As a result, the stopper member 63 can be slid step by step in the up-down direction along the hole portion 62c1 with the bent portion depressed inwards into the hole portion 62c1 and can be fixed in an appropriate slide position in the hole portion 62c1 by allowing the bent portion to be elastically restored to the outside position after the stopper member 63 is slid as required.

The support plate portion 64 has a curved wall portion 64a, upper attachment portions 64b, which are provided individually at both ends of the curved wall portion 64*a*, and an adjustment plate portion 64*c*, which is provided at one of the ends of the curved wall portion 64*a*. The curved wall portion 64*a* has a wall shape which rises along the up-down direction and curves into an arcing shape along the annular frame portion 62*a*, and left and right end portions are bent to extend to the rear. A cover attachment hole 64*a*1 for attaching the front cover portion 68 is provided in the curved wall portion 64*a* at a front central upper portion thereof. The curved wall portion 64*a* is connected to the annular frame portion 62*a* at a lower end thereof. Each upper attachment portion 64*b* is provided at a portion which extends rearwards from each end portion of the curved wall portion 64*a* in such a manner as to vertically face a corresponding one of the lower attachment portions 62*c*2 of the annular portion 62 and has two screw holes which are opened in the up-down direction and aligned side by side in the front-rear direction.

The adjustment plate portion 64*c* rises into a plate-like shape from the one end portion of the curved wall portion 64*a* in such a manner as to continue from the curved wall portion 64*a*, and a plate surface of the adjustment plate portion 64*c* is oriented in the left-right direction and has a substantially triangular shape. In such a state that the constituent members making up the support frame 60 are assembled together, a rising direction of the adjustment plate portion 64*c* becomes substantially parallel to a rising direction of the rising portion 62*c* of the annular portion 62. An adjustment plate-side first slit (an engagement hole) 64*c*1, which opens into a slit-like shape, is provided in the plate surface of the adjustment plate portion 64*c* at a lower side thereof, and an adjustment plate-side second slit (an engagement hole) 64*c*2, which opens into a slit-like shape, is provided above the adjustment plate-side first slid 64*c*1. The adjustment plate-side first slit 64*c*1 is formed into a substantially arcing shape which moderately curves downwards. The first screw shaft 81, which is exposed from the external surface of the right wall portion 30*d* of the encasement case 30, is brought into engagement with the adjustment plate-side first slit 64*c*1 in such a manner as to move within the adjustment plate-side first slit 64*c*1.

On the other hand, the adjustment plate-side second slit 64*c*2 is formed into a substantially arcing shape which moderately curves upwards. The second screw shaft 82, which is exposed from the external surface of the right wall portion 30*d* of the encasement case 30, is brought into engagement with the adjustment plate-side second slit 64*c*2 in such a manner as to move within the adjustment plate-side second slit 64*c*2. Then, a washer, not shown, is brought into mesh engagement with the second screw shaft 82 between a head portion of the second screw shaft 82 and the adjustment plate portion 64, so that the adjustment plate portion 64*c* is prevented from being disengaged from the second screw shaft 82. In addition, a fulcrum shaft 64*c*3, which projects short outwards into a shaft-like shape from the plate surface of the adjustment plate portion 64*c*, is provided between the adjustment plate-side first slit 64*c*1 and the adjustment plate-side second slit 64*c*2 on the plate surface of the adjustment plate portion 64*c*.

The link member 66 is a thin, elongated flat plate-shaped member, and one end of the link member 66 is slightly bent, whereby the link member 66 is formed into a hook-like shape. A link-side first slit (a first attachment hole) 66*a*, which opens into a slit-like shape, is provided in a plate surface of the link member 66 at one end thereof, and a link-side second slit (a second attachment hole) 66*b*, which opens into a slit-like shape, is provided in the plate surface of the link member 66 at the other end thereof. The second screw shaft 82 is brought into engagement with the link-side first slit 66*a* via the adjustment plate-side second slit 64*c*2 in such a manner as to move within the adjustment plate-side second slit 64*c*2 while being screwed in place in the attachment hole in the screw attachment portion 44*b*1. That is, the second screw shaft 82 brings the discharge-side cover 34, the link member 66, the support plate portion 64, the attachment plate 44, and the projector 10 attached to the attachment plate 44 into engagement together. Then, a washer, not shown, is brought into mesh engagement with the first screw shaft 81 between a head portion of the first screw shaft 81 and the link member 66, so that the link member 66 and the adjustment plate portion 64*c* are prevented from being disengaged from the first screw shaft 81. On the other hand, the butterfly screw 67 is passed through the link-side second slit 66*b* from an outside thereof. The second screw shaft 82 is brought into engagement with the adjustment plate-side second slit 64*c*2 in such a manner as to move within the adjustment plate-side second slit 64*c*2 while being screwed in the attachment hole in the other screw attachment portion 44*b*1. That is, the first screw shaft 81 brings the discharge-side cover 34, the support plate portion 64, the attachment plate 44, and the projector 10 attached to the attachment plate 44 into engagement together.

A fulcrum hole 66*c* is provided in the plate surface of the link member 66 between the link-side first slit 66*a* and the link-side second slit 66*b* so as to allow the fulcrum shaft 64*c*3 of the adjustment plate portion 64*c* to pass therethrough. The link member 66 is pivotally supported on the fulcrum shaft 64*c*3 in such a manner as to rotate around an axis of the fulcrum shaft 64*c*3 over the plate surface of the adjustment plate portion 64*c* as a result of the fulcrum shaft 64*c*3 being passed through the fulcrum hole 66*c*. Then, as a result of the butterfly screw 67, which is passed through the link-side second slit 66*b*, being tightened, the link member 66 is fixed to the adjustment plate portion 64*c* at the link-side second slit 66*b*, so that the rotation of the link member 66 is restricted.

The front cover portion 68 is made into a member having a substantially semi-cylindrical shape and configured to cover a front side of the annular portion 62 and the support plate portion 64. A projecting portion (not shown) is provided at a front central portion on an inner surface of the front cover portion 68, and the front cover portion 68 is attached to the support plate portion 64 as a result of the projecting portion being brought into engagement with the cover attachment hole 64*a*1 provided in the curved wall portion 64*a* of the support plate portion 64. The rear cover portion 69 is made into a member having a substantially semi-cylindrical shape and configured to cover a rear side of the annular portion 62 and the support plate portion 64. The front cover portion 68 and the rear cover portion 69 are joined together with machine screws or the like, and joining both the cover portions together forms a semi-cylindrical cover member.

A cover-side first cut-out 69*a*, which is cut out into an elongated rectangular shape which opens downwards, is provided at each of both end portions (left and right end portions) of the rear cover portion 69. Each cover-side first cut-out 69*a* is cut out in such a manner as to match in position the hole portion 62*c*1 provided in the rising portion 62*c*, so that the rear cover 69 is prevented from interfering with the stopper member 63 which is brought into engagement with the hole portion 62*c*1 when the circumference of the hole portion 62*c*1 is covered by the rear cover portion 69. In addition, a cover-side second cut-out 69, which is cut out into a substantially arcing shape while opening upwards, is provided in a rear portion of the rear cover portion 69. Further, a pillow portion 69c, which is a pillow-shaped projection, is provided on an upper surface of one end portion of both the end portions of the rear cover 69, the one end portion covering an opposite end portion to the end portion of the support plate portion 64 where the adjustment plate portion 64c is provided.

As shown in FIG. 10B, in such a state that the members making up the support frame 60 are assembled together, the flange portion 62b of the annular portion 62, both the stopper members 63, and an upper portion of the adjustment plate portion 64c which lies upwards of the fulcrum shaft 64c3 are exposed from the front cover portion 68 and the rear cover portion 69, and the other portions are covered by the front cover portion 68 and the rear cover portion 69. Then, a frame-side opening (an opening) 60a, which opens upwards and faces the inside of the support frame 60, is formed in an upper portion of the support frame 60.

Figure 11:
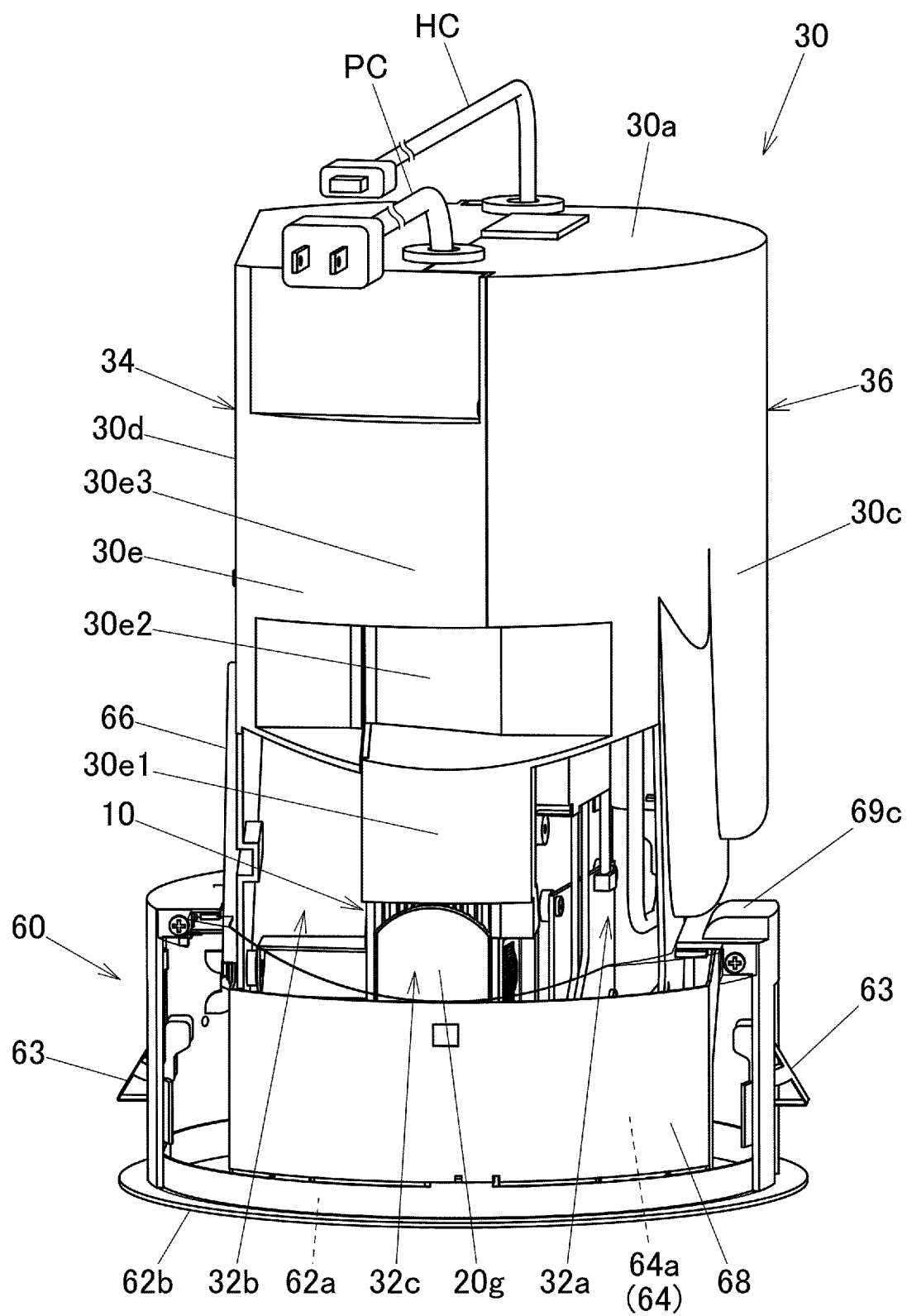
FIG. 11 is a partially see-through front view of the encasement case supported in the support frame as seen from a front thereof.

Next, a supporting manner of the encasement case 30 by the support frame 60 will be described. In attaching the encasement case 30 to the support frame 60, the encasement case 30 is fitted in the frame-side opening 60a in the support frame 60, the first screw shaft 81, which is exposed from the external surface of the right wall portion 30d, is brought into engagement with the adjustment plate-side first slit 64c1 in the adjustment plate portion 64c, and further, the second screw shaft 82, which is also exposed from the external surface of the right wall portion 30d, is brought into engagement with the adjustment plate-side second slit 64c2 in the adjustment plate portion 64c. As a result, the encasement case 30 is supported in the support frame 60. That is, as shown in FIG. 11, the encasement case 30 is supported in the support frame 60 only on a right-hand side (a side where the discharge-side cover 34 is provided) thereof. In other words, the support frame 60 supports the encasement case 30 only by the adjustment plate portion 64c. Here, in FIG. 11, only the front cover portion 68 is seen through.

In FIG. 11, the encasement case 30 is shown as being supported in a vertical posture with respect to the support frame 60. In this state, the projection port 20g of the projector 10 is directed forwards, and substantially a half of the projection port 20g is exposed to the front from the support frame 60. With the encasement case 30 which is supported in the support frame 60 in the manner described above, the encasement case 30 can be tilted to the front with respect to the support frame 60 from the state shown in FIG. 11 by causing the first screw shaft 81 to move within the adjustment plate-side first slit 64c1 and the second screw shaft 82 to move within the adjustment plate-side second slit 64c2 (refer to FIG. 1). That is, as described above, since the axial directions of the first screw shaft 81 and the second screw shaft 82 intersect the light axis LC of projected light emitted from the projector 10 at right angles, the support frame 60 pivotally supports the encasement case 30 so that the encasement case 30 can rotate around the axis which is at right angles to the light axis LC of the projected light.

The projection port 20g is put in a state in which the projection port 20g is directed obliquely downwards by tilting the encasement case 30 to the front with respect to the support frame 60, whereby an obliquely downward projection can be executed from the inside of the support frame 60. Then, the direction of the projection port 20g, that is, a projection angle can be adjusted by moving the first screw shaft 81 and the second screw shaft 82 as required. Here, in tilting the encasement case 30 with respect to the support frame 60, the encasement case 30 is tilted while a lower portion of the left wall portion 30c is sliding on or approaching a surface of the pillow portion 69c of the support frame 60. As a result, in tilting the encasement case 30, the encasement case 30 can be prevented or restrained from tilting to the left.

Figure 12:
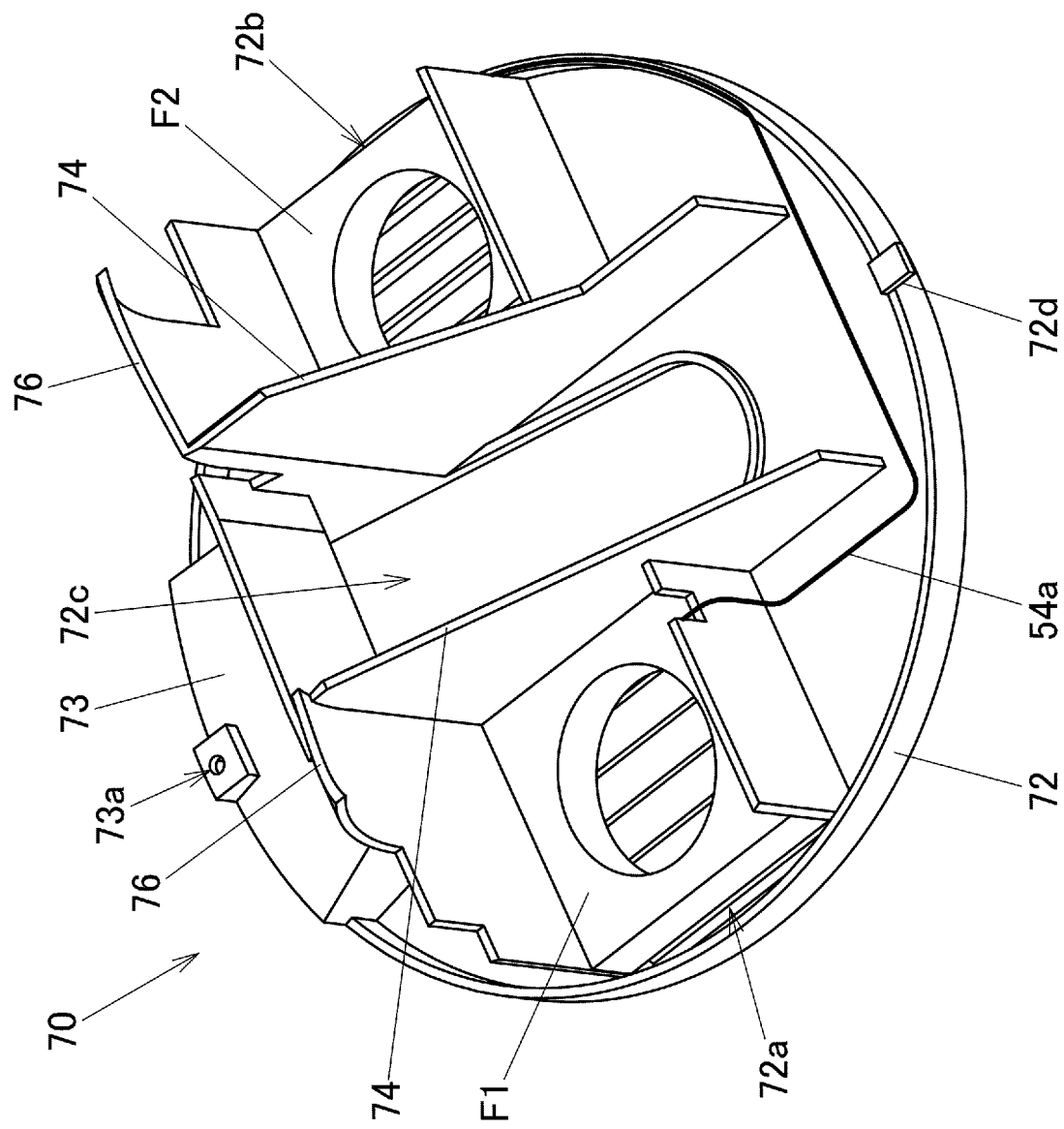
FIG. 12 is a perspective view of an intake and discharge fan according to the embodiment.

Next, the configuration of the intake and discharge fan 70 possessed by the support frame 60 will be described. The intake and discharge fan 70 is attached in place in an inside of the support frame 60 after the encasement case 30 supported in the support frame 60 is placed in place in the inside of the opening CO provided in the ceiling material C. As shown in FIG. 12, the intake and discharge fan 70 is a circular member which is sized so as to be encased in the inside of the support frame 60 and has a circular dish portion 72, a raised portion 73, a pair of sloping walls 74, and a pair of fan-side ribs 76, whereby an intake fan (a first blower portion) F1 and a discharge fan (a second blower portion) F2 are placed on the circular dish portion 72. Here, in the following description of the intake and discharge fan 70, in FIG. 12, a right downward direction denotes a front side of the intake and discharge fan 70, and an opposite side or direction denotes a rear side thereof.

The circular dish portion 72 is a member having a circular, flat, and shallow dish shape. A fan opening portion 72c, which is opened wide in a longitudinal direction, is provided in the circular dish portion 72 at a central portion thereof. An intake fan placement portion 72a where to place the intake fan F1 and a discharge fan placement portion 72b where to place the discharge pan F2 are individually provided at both sides of the fan opening portion 72c. The intake fan placement portion 72a has an opening portion, not shown, for causing air to flow from a lower side of the circular dish portion 72 (a surface opposite to a surface on which the intake fan F1 is placed, that is, a bottom surface of the circular dish portion 72) towards the intake fan F1, and the intake fan F1 is placed on an upper side of the opening portion. Similarly, the discharge fan placement portion 72b has an opening portion, not shown, for causing air to flow from the discharge fan F2 towards the lower side of the circular dish portion 72, and the discharge fan F2 is placed on an upper side of the opening portion. In addition, an engagement piece 72d, which is to be brought into engagement with the support frame 60, is provided at a portion on a front side of an edge portion of the circular dish portion 72 which rises to define a shallow depth of the circular dish portion 72.

The intake fan F1 and the discharge fan F2 are both a box-shaped member of a rectangular shape as viewed from above, which has a circular fan. In addition, the intake fan placement portion 72a and the discharge fan placement portion 72b are both formed into rectangular shapes matching in shape and size the intake fan F1 and the discharge fan F2, respectively. The wires 54a extending from the control board 54 are individually laid around so as to individually connect with the intake fan F1 and the discharge fan F2, whereby a driving power supply is provided for the intake fan F1 and the discharge fan F2. The intake fan F1 placed in the intake fan placement portion 72a functions as a fan for sending air from the outside (the lower side of the circular dish portion 72, the bottom surface of the circular dish portion 72) to the intake-side opening portion 32a of the encasement case 30. The discharge fan F2 placed in the discharge fan placement portion 72b functions as a fan for sending air discharged from the discharge-side opening portion 32b of the encasement case 30 to the outside (the lower side of the circular dish portion 72, the bottom surface of the circular dish portion 72). Here, the intake fan F1 and the discharge fan F2 are both an axial-flow fan, and in FIG. 12, propellers thereof are omitted from illustration. Additionally, the fans are not limited to the axial-flow fan, and hence, a fan of a different type such as a DC fan may be used.

The raised portion 73 is a portion which is provided at a rear side of the circular dish portion 72 in such a manner as to be raised upwards, and a fan-side screw hole 73a, through which a screw is passed to be screwed to the support frame 60, is provided at a rear side of an upper surface of the raised portion 73. The pair of sloping walls 74 are walls which individually rise upwards from a dish surface of the circular dish portion 72 in such a manner as to individually form a partition between the fan opening portion 72c and the intake fan placement portion 72a and a partition between the fan opening portion 72c and the discharge fan placement portion 72b. As a result, the intake fan F1 and the discharge fan F2 are separated by the pair of sloping walls 74. In each sloping wall 74, a rising distal end portion slopes downwards from a rear end to a front end thereof. The fan-side ribs 76 are walls which individually rise upwards from the dish surface of the circular dish portion 72 in such a manner as to individually form a partition between the raised portion 73 and the intake fan placement portion 72a and a partition between the raised portion 73 and the discharge fan placement portion 72b. Each fan-side rib 76 is formed into a shape in which a rising distal end portion thereof moderately curves towards the front.

Next, a placement method for placing the encasement case 30 in the inside of the substantially circular opening CO provided in the ceiling material C will be described. Firstly, before the placement of the encasement case 30, the constituent members including the projector 10, which are to be encased in the inside of the encasement case 30, are encased in the space S defined in the inside of the encasement case 30 in such a manner as to cover the projector 10. As this occurs, the projector 10 is encased in the inside of the space S in such a manner that the projection port 20g is exposed to the outside from the projection opening portion 32c. Then, the encasement case 30, which now encases therein the constituent members, is supported in the vertical posture by the support frame 60. Subsequently, each stopper member 63 is slid to an appropriate position inside the hole portion 62c1 to be adjusted in position so that a distance D1 (refer to FIGS. 13A and 14A) between a lower end of the stopper member 63 and the flange portion 62b of the support frame 60 becomes substantially equal to a thickness D2 of an opening edge of the opening CO in the ceiling material C, which constitutes a placement target.

Figure 14A:
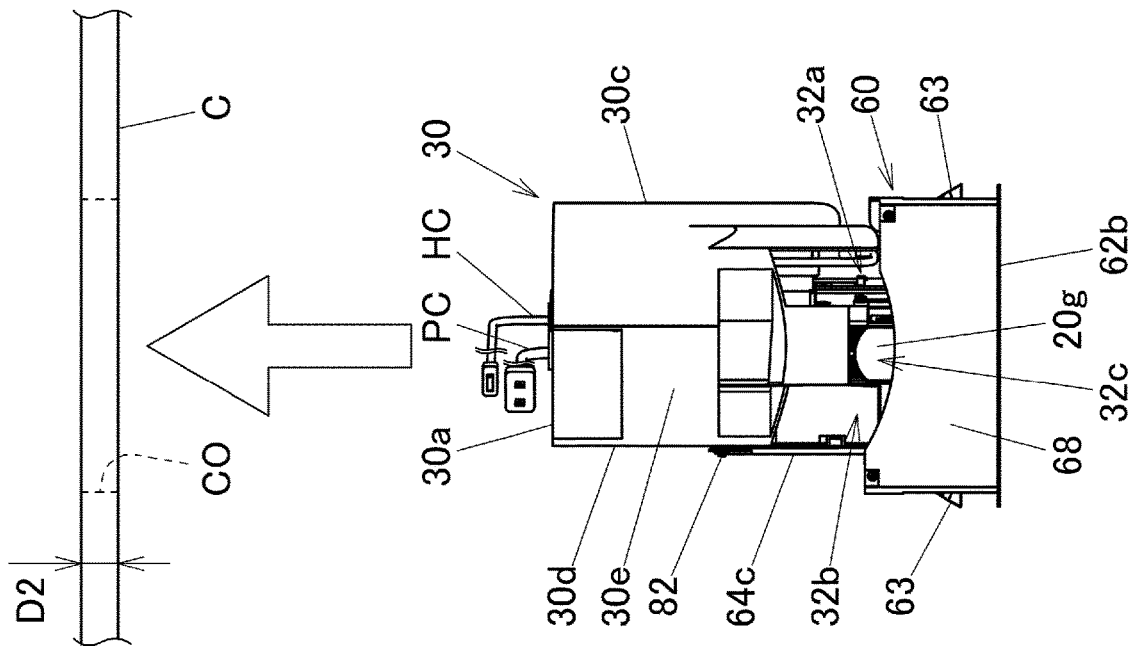

Next, as shown in FIGS. 13A and 14A, the encasement case 30 which is supported in the vertical posture by the support frame 60 is fitted in the opening CO in the ceiling material C, which constitutes the placement target, from below the opening CO for attachment. Here, the encasement case 30 is sized so as to be encased in the inside of the annular portion 62 while being supported in the vertical posture. As this occurs, the outer surface of each stopper member 63 is pressed against by the opening edge (an opening circumference) of the opening CO and is then elastically deformed inwards. As a result, the support frame 60 including the stopper members 63 can be fitted into the opening CO to such an extent that an upper surface of the flange portion 62b of the support frame 60 is brought into abutment with the opening edge of the opening CO. Then, when the upper surface of the flange portion 62b comes into abutment with the opening edge of the opening CO, the pressing force is released from the outer surface of each stopper member 63 to thereby allow the stopper member 63 to elastically be restored to the outward position, whereby a state results in which the opening edge of the opening CO is held between the stopper member 63 and the flange portion 62b (a state shown in FIGS. 13B and 14B). As a result, the encasement case 30 which is supported in the support frame 60 is placed in the inside of the opening CO in the ceiling material C.

Here, the encasement case 30 can be tilted by moving the encasement case 30 supported in the support frame 60 to thereby cause the first screw shaft 81 to move within the adjustment plate-side first slit 64c1 or cause the second screw shaft 82 to move within the adjustment plate-side second slit 64c2. That is, the encasement case 30 is supported by the support frame 60 in such a manner that the intake-side opening portion 32a, the discharge-side opening portion 32b, and the projection opening portion 32c are oriented towards the opening CO in the ceiling material C. Here, the encasement case 30 which is placed in the inside of the opening CO in the vertical posture can be manually tilted in the inside of the annular portion 62 of the support frame 60 from therebelow.

Subsequently, a method for adjusting the projection angle of projected light projected from the projection opening portion 32c of the encasement case 30 will be described. As described above, the encasement case 30 can be tilted by moving the encasement case 30 so as to cause the first screw shaft 81 or the second screw shaft 82 to move, whereby the projection angle of projected light can be adjusted. For example, as shown in FIG. 15A, the encasement case 30 can be put in a state in which the encasement case 30 is tilted from the vertical posture to a predetermined angle (hereinafter, referred to as a "first projection angle" ($\theta 1$)) by causing the first screw shaft 81 to move from one end to the other end in the adjustment plate-side first slit 64c1. As a result, projected light L1, which is projected from the projection opening portion 32c which is tilted from the vertical posture to the first projection angle, can be projected towards a wall W.

Then, as shown in FIG. 15B, the encasement case 30 can be put in a state in which the encasement case 30 is tilted from the vertical posture to a projection angle at which the encasement case 30 is tilted more than at the first projection angle $\theta 1$ (hereinafter, referred to as a "second projection angle" ($\theta 2$)) by causing the second screw shaft 82 to move from one end to the other end of the adjustment plate-side second slit 64c2 from the state in which the encasement case 30 is tilted to the first projection angle. As a result, projected light L2, which is projected from the projection opening portion 32c further downwards than at the first projection angle, can be projected towards the wall W. Here, the projection angle of projected light projected from the encasement case 30 is not limited to the first projection angle $\theta 1$ and the second projection angle $\theta 2$ but can be adjusted as required between the first projection angle and the second projection angle. In addition, the first projection angle $\theta 1$ is, for example, 45°, and the second projection angle $\theta 2$ is, for example, 60°.

Next, an attachment method for attaching the intake and discharge fan 70 to the support frame 60 will be described. The intake and discharge fan 70 is attached to the support frame 60 in such a manner as to communicate with the case opening portion 32 after the encasement case 30 which is supported in the support frame 60 is placed in the inside of the opening CO in the ceiling material C. Here, as will be described later, in the case that the encasement case 30 supported in the support frame 60 takes the vertical posture (specifically, in the case that the encasement case 30 is tilted at a smaller angle than the first projection angle), the intake and discharge fan 70 which is to be attached to the support frame 60 interferes with a part of the encasement case 30, and hence, the intake and discharge fan 70 cannot be attached to the support frame 60. Then, as shown in FIGS. 15A and 15B, after the encasement case 30 supported in the support frame 60 is placed in the inside of the opening CO in the ceiling material C, the encasement case 30 is tilted at the first projection angle θ1 or more before the intake and discharge fan 70 is attached to the support frame 60.

The intake and discharge fan 70 can be attached to the support frame 60 by fitting the intake and discharge fan 70 in the inside of the support frame 60 from below the opening CO in the ceiling material C (refer to FIG. 15A). Specifically speaking, the engagement piece 72d of the intake and discharge fan 70 is brought into engagement with the fan attachment hole 62a2 of the support frame 60, and the fan-side screw hole 73a of the intake and discharge fan 70 is superposed on the fan attachment screw hole 62a1 of the support frame 60. Then, the intake and discharge fan 70 can be fixedly attached to the support frame 60 by executing a screwing operation from an outer side (a lower side) of the fan-side screw hole 73a. Here, the two wires 54a extending from the control board 54 inside the encasement case 30 are individually connected in advance with the intake fan F1 and the discharge fan F2.

Figure 16A:
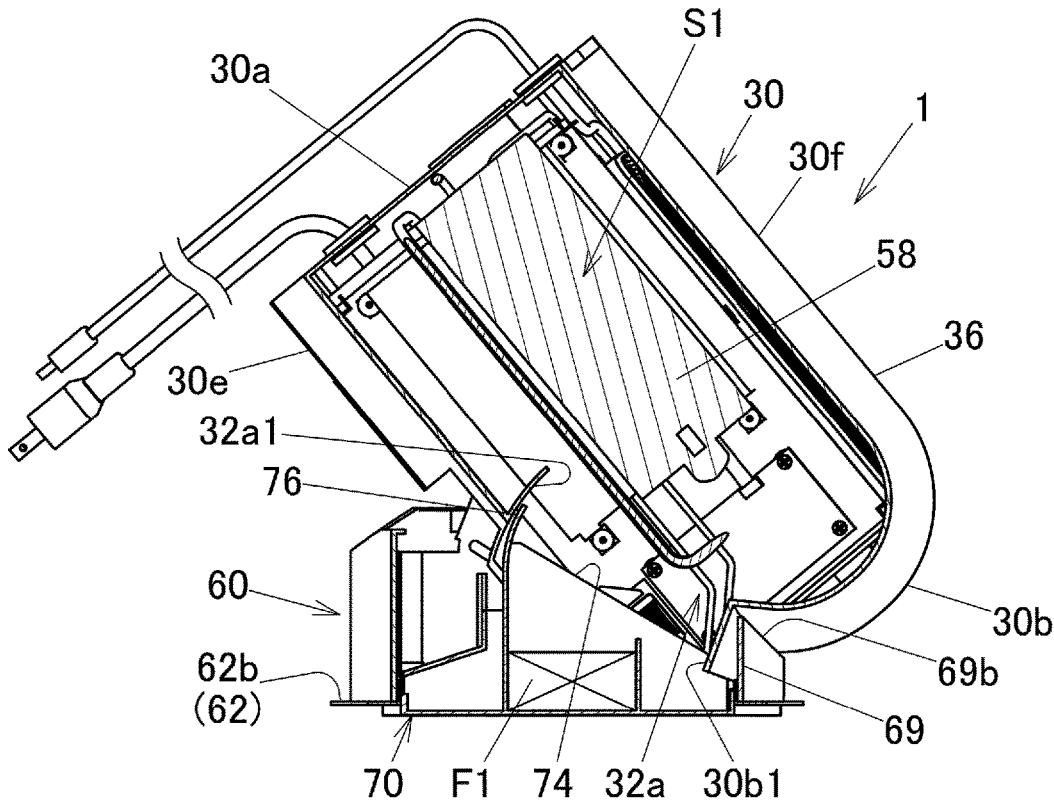
FIG. 16A is a sectional view of the placement structure of the encasement member whose projection angle is adjusted at the first projection angle, which is taken along a vertical plane passing through an intake-side opening portion.
Figure 16B:
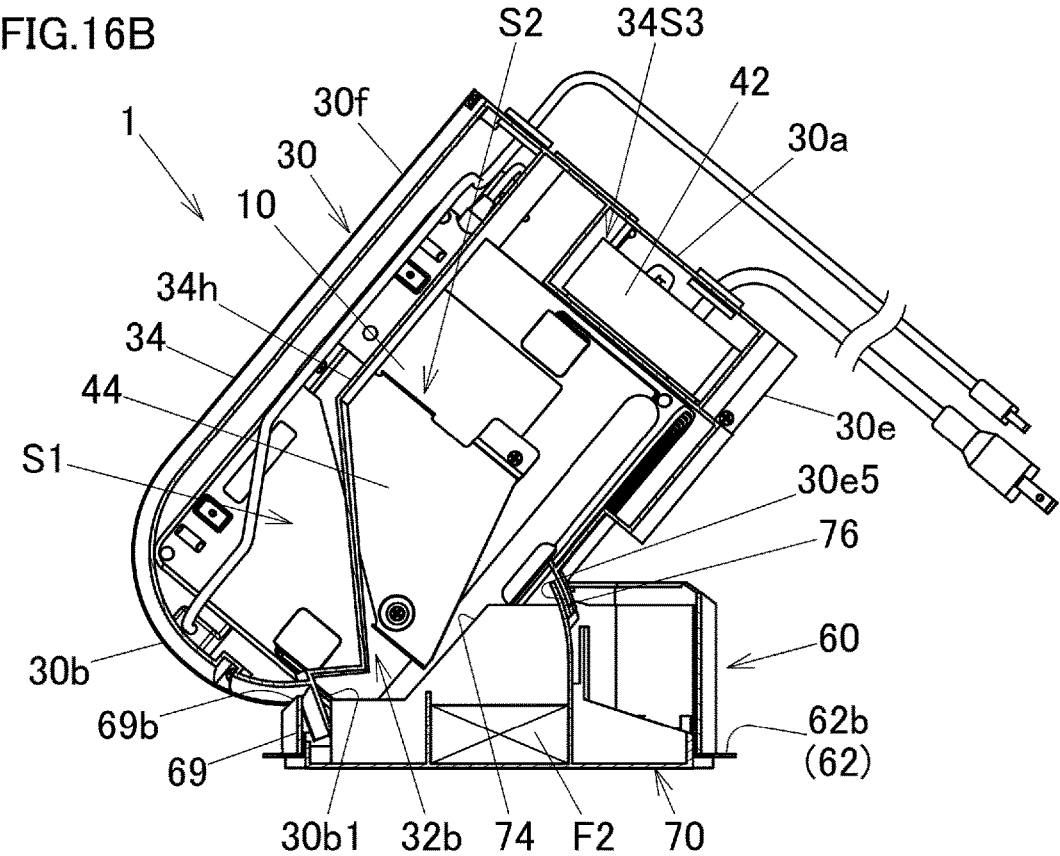
FIG. 16B is a sectional view of the placement structure of the encasement member whose projection angle is adjusted at the first projection angle, which is taken along a vertical plane passing through a discharge-side opening portion.

Next, referring to FIGS. 16A and 16B, an assembling manner of the encasement case 30, the support frame 60, and the intake and discharge fan 70 of the projection system 1 will be described. When the intake and discharge fan 70 is attached to the support frame 60, an air flow path of the intake and discharge fan 70 communicates with the intake-side opening portion 32a (refer to FIG. 16A), and an air flow path of the discharge fan F2 communicates with the discharge-side opening portion 32b (refer to FIG. 16B).

Here, as a result of the encasement case 30 being tilted at an angle equal to or larger than the first projection angle θ1, a portion of the casing 20 of the projector 10 which lies in the vicinity of the left front corner portion 20h thereof enters a space defined between the pair of sloping walls 74 of the intake and discharge fan 70, resulting in a state in which the portion of the casing 20 of the projector 10 is held between the pair of sloping walls 74. As a result, since a space defined above the intake fan F1 is separated from a space defined above the discharge fan F2 by the pair of sloping walls 74 and the portion of the casing 20 of the projector 10, air flowing from the intake-side opening portion 32a to the first intake port 23b, the second intake port 24a, and the third intake port 25a of the projector 10 is prevented or restrained from mixing with air discharged from the first discharge port 23c and the second discharge port 21c of the projector 10 to flow to the discharge-side opening portion 32b. Further, outside air is prevented or restrained from flowing from the fan opening portion 72c of the intake and discharge fan 70 into the intake space S1 and the discharge space S2.

As a result, air can be taken in effectively from the outside of the opening CO in the ceiling material C (an inside space surrounded by the ceiling material C and the wall W in FIG. 15A (a room or the like)) individually into the first intake port 23b, the second intake port 24a, and the third intake port 25a possessed by the projector 10 by way of the intake fan F1. Additionally, air discharged from the first discharge port 23c and the second discharge port 21c possessed by the projector 10 can be discharged effectively from the opening CO in the ceiling material C towards the outside thereof by way of the discharge fan F2. Here, as a result of the encasement case 30 being tilted at the angle equal to or larger than the first projection angle θ1, thereby causing the portion of the casing 20 of the projector 10 to be held between the pair of sloping walls 74, a state results in which the projection port 20g of the projector 10 faces the fan opening portion 72c of the intake and discharge fan 70 (a state in which the projection port 20g is exposed to the outside from the fan opening portion 72c). As a result, projected light projected from the projection port 32c of the encasement case 30 is prevented from being cut off by the intake and discharge fan 70, whereby the projected light can be projected onto the wall W or the like.

With the encasement case 30 kept taking the vertical posture, even in the event that the intake and discharge fan 70 is attempted to be attached to the support frame 60, the lower rib 30b1 of the encasement case 30 interferes with the fan-side ribs 76 of the intake and discharge fan 70, whereby the intake and discharge fan 70 cannot be attached to the support frame 60. Then, as shown in FIGS. 16A and 16B, the lower rib 30b1 of the encasement case 30 approaches an inner surface of the rear cover 69 of the support frame 60 as a result of the encasement case 30 being tilted to the first projection angle θ1, whereby the cover-side second cut-out 69b approaches the lower wall portion 30b of the encasement frame. As a result, a gap between the lower wall portion 30b of the encasement case 30 and the support frame 60 is shielded effectively. Then, the intake and discharge fan 70 can be attached to the support frame 60 without interference with the lower rib portion 30b1. As a result, the projection angle of projected light projected from the encasement case 30 is set at an angle in a range from the first projection angle θ1 to the second projection angle θ2 after the intake and discharge fan 70 is attached to the support frame 60 (after the encasement case 30 is placed in the inside of the opening CO in the ceiling material C). This prevents the projected light L1 or the projected light L2 from being projected to a space on the back side of the ceiling (a space on the inner side of the opening CO), causing the projected light L1 or the projected light L2 to travel in the direction of the wall W. As a result, an adjustment failure or a setting error of the projection angle of the encasement case 30 can be prevented from occurring. In other words, the intake and discharge fan 70 functions as an adjustment failure or setting error preventive member for preventing the occurrence of an adjustment failure or a setting error of the projection angle of the encasement case 30.

In such a state that the encasement case 30 is tilted to the first projection angle θ1, an opening edge 32a1 of the intake-side opening portion 32a of the encasement case 30 approaches or comes into abutment with one of the pair of fan-side ribs 76 of the intake and discharge fan 70 on the intake-side cover 36, whereas on the discharge-side cover 34, a lower surface of the upper rib portion 30e5 of the encasement case 30 approaches or comes into abutment with the other fan-side rib 76 of the intake and discharge fan 70. As a result, a gap between the front wall portion 30e of the encasement case 30 and the intake and discharge fan 70 is effectively shielded. Then, in tilting the encasement case 30 further from the first projection angle θ1, the encasement case 30 is tilted so while the opening edge 32a1 of the intake-side opening portion 32a is sliding on or approaching one fan-side rib 76 on the intake-side cover 36, whereas on the discharge-side cover 34, the lower surface of the upper rib portion 30e5 is sliding on or approaching the other fan-side rib 76.

As a result of the encasement case 30, the support frame 60, and the intake and discharge fan 70 being assembled together in the manner described above, a state results in which a gap between the intake space S1 and the discharge space S2 which are defined in the inside of the encasement case 30 which is placed in the inside of the opening CO in the ceiling material C and the space defined on the inner side of the opening CO in the ceiling material C (the space on the back side of the ceiling) is almost shielded. In other words, the intake space S1 and the discharge space S2, which are defined in the inside of the encasement case 30, are isolated from the space defined on the inner side of the opening CO in the ceiling material C. As a result, in the projection system 1, airtightness is secured in such a state that the encasement case 30 is tilted at an angle in the range from the first projection angle θ1 to the second projection angle θ2. As a result, gas (air) taken into the inside portion of the encasement case 30 is used efficiently to cool the projector 10, and gas warmed by heat generated as a result of operation of the projector 10 can be discharged efficiently to the outside of the encasement case 30. Here, the airtightness in the inside portion of the encasement case 30 can be increased higher by filling the slight gap defined between the intake space S1 and the discharge space S2 in the inside portion of the encasement case 30 and the space on the inner side of the opening CO in the ceiling material C with, for example, a sponge member or a sheet of film.

The encasement case 30 according to the embodiment which has been described heretofore can be placed in the inside of the opening CO in the ceiling material C in such a state that the projector 10 is encased in the inside portion thereof, and projection can be executed towards the wall W or the like from the projector 10 encased in the encasement case 30 so placed. Then, since the space S defined in the inside portion of the encasement case 30 which is placed in the inside of the opening CO in the ceiling material C is isolated from the space on the inner side of the opening CO in the ceiling material C (the space on the back side of the ceiling), whereby the airtightness is secured, the exposure of the projector 10 inside the encasement case 30 to the temperature environment in the space defined on the inner side of the opening CO in the ceiling material C can be prevented or restrained from occurring. As a result, the projector 10 is cooled using efficiently gas taken in, and gas warmed by heat generated as a result of operation of the projector 10 is efficiently discharged, whereby a risk of a problem such as an operation failure or the like occurring in the projector 10 can be reduced, whereby preferable projection can be executed from the projector 10 placed in the inside of the opening CO in the ceiling material C.

In the encasement case 30, the first partition wall 34$h$ is provided on the discharge-side cover 34, and in the case that the projector 10 is encased in the encasement case 30, the discharge-side cover 34 and the intake-side cover 36 have the intake-side opening portion 32$a$ which communicates with the intake space S1 and the discharge-side opening 32$b$ which communicates with the discharge space S2. As a result, the ventilation of the projector 10 encased in the encasement case 30 can be executed effectively, whereby efficient cooling of the projector 10 can be realized while preventing or restraining the exposure of the projector 10 to the temperature environment in the space defined on the inner side of the opening CO in the ceiling material C.

In the encasement case 30, the intake ports (the first intake port 23$b$, the second intake port 24$a$, the third intake port 25$a$) possessed by the projector 10 exist inside the intake space S1, but no discharge port exists in the intake space S1, whereas the discharge ports (the first discharge port 23$c$, the second discharge port 21$c$) possessed by the projector 10 exist in the discharge space S2, but no intake port exists inside the discharge space S2. As a result, all intake air to be taken into the projector 10 flows into the intake space S1, and all discharge air to be discharged from the projector 10 flows into the discharge space S2. As a result, the ventilation of the projector 10 encased inside the encasement case 30 can be executed more effectively.

In the encasement case 30, in the case that the projector 10 is encased in the encasement case 30, the discharge-side cover 34 and the intake-side cover 36 have the projection opening portion 32$c$ defined between the intake-side opening portion 32$a$ and the discharge-side opening portion 32$b$ in such a manner that the projection port 20$g$ from which the projector 10 projects an image is exposed theretrough. As a result, an image can be projected from the projection opening portion 32$c$ of the encasement case 30, whereby a specific configuration can be provided in which projection is executed from the encasement case 30 which is placed in the inside of the opening CO in the ceiling material C.

In addition, in the encasement case 30, the discharge-side cover 34 and the intake-side cover 36 have the second cable hole portion H2 through which the video/voice transmission cable HC for inputting an image into the projector 10 is passed from the outside portion of the discharge-side cover 34 and the intake-side cover 36. As a result, a specific configuration can be provided in which the video/voice transmission cable HC is laid out in the inside portion of the encasement case 30.

In the encasement case 30, the first partition wall 34$h$ includes the high wall portion 34$h$1 having the first height and the low wall portion 34$h$2 having the second height which is smaller in height than the first height, and the projector 10 is brought into abutment with the rising distal end portion 34$h$2 of the low wall portion 34$h$2. As a result, a specific configuration can be provided in which the intake space S1 and the discharge space S2 are isolated from the other spaces by encasing the projector 10 in the inside portion of the encasement case 30.

In the encasement case 30, the discharge-side cover 34 has the second partition wall 34$i$, and the second partition wall 34$i$ forms the upper space 34S3 which is isolated from the intake space S1 and the discharge space S2 when the projector 10 is encased in the encasement case 30. As a result, a specific configuration can be provided in which the upper space 34S3 which is isolated from the intake space S1 and the discharge space S2 is formed in the inside portion of the encasement case 30.

The signal wire of the power supply cable PC extending from the projector 10 or the accessory member associated with the projector 10, or the like is disposed in the upper space 34S3. As a result, a specific configuration can be provided in which the various signal wires, the terminal stand 42, and the like are encased in the inside portion of the encasement case 30.

The projection system 1 has the encasement case 30, the projector 10, and the support frame 60 which supports the encasement case 30. As a result, a specific configuration of the projection system can be provided in which an image is projected by attaching the encasement case 30 to the circumference of the opening CO in the ceiling material C.

In the projection system 1, the support frame 60 has the annular frame portion 62$a$ which forms the frame-side opening 60 and the intake and discharge fan 70. As a result, the ventilation of the projector 10 encased inside the encasement case 30 can be executed effectively by way of the intake-side opening portion 32$a$ and the discharge-side opening portion 32$b$ by the intake and discharge fan 70.

The embodiment that has been described heretofore is presented as an example, and hence, there is no intention to limit the scope of the invention by the embodiment. The novel embodiment can be carried out in other various forms, and various omissions, replacements, and modifications can be made thereto without departing from the spirit of the invention. These resulting embodiments and their modifications are included in the scope and spirit of the invention and are also included in inventions claimed under claims to be made herebelow and equivalents thereof.

For example, in the embodiment that has been described heretofore, while the placement structure of the encasement member is illustrated which is placed in the inside of the substantially circular opening provided in the ceiling material, the placement structure of the encasement member according to the present embodiment can also be applied to an opening provided in other materials than the ceiling material (for example, an opening provided in a wall material, an opening provided in a wall material of a pillar of a quadrangular prism shape, or the like). In addition, the placement structure of the encasement member according to the present embodiment can also be applied to openings other than the substantially circular opening. In this case, the shape and size of the support frame can be made to match an opening which constitutes an attachment target. In addition, in the embodiment described above, while the example is illustrated in which the two wires for individually driving the intake fan and the discharge fan extend from the control board, in addition to this configuration, a configuration may be adopted in which a ground wire extends from the control board.

What is claimed is:

1. An encasement apparatus comprising:
   a case main body configured to freely encase equipment in an inside portion thereof,
   wherein the case main body comprises a first partition wall configured to divide a space in the inside portion into a first isolated space and a second isolated space together with the equipment in such a state that the equipment is encased in the inside portion,
   wherein the case main body comprises a first opening portion communicating with the first isolated space and a second opening portion communicating with the second isolated space.
2. The encasement apparatus according to claim 1,
   wherein the equipment comprises a projection member configured to project an image, and the encasement apparatus further comprising:
   a projection opening provided between the first opening portion and the second opening portion in such a state that the equipment is encased in the inside portion of the case main body and configured to expose the projection member to an outside of the case main body.
3. The encasement apparatus according to claim 1,
   wherein the equipment comprises a projection member configured to project an image, and the encasement apparatus further comprising:
   a hole portion configured to enable an image input member for inputting the image into the equipment to be passed through.
4. The encasement apparatus according to claim 1,
   wherein the first partition wall comprises a first wall portion having a first height and a second wall portion having a second height which is smaller in height than the first height, and
   wherein in a case that the equipment is encased in the inside portion of the case main body, the second wall portion is brought into abutment directly or indirectly with the equipment.
5. The encasement apparatus according to claim 1,
   wherein the case main body comprises a second partition wall, and
   wherein in a case that the equipment is encased in the inside portion of the case main body, the second partition wall forms a third isolated space which is isolated from the first isolated space and the second isolated space.
6. The encasement apparatus according to claim 5,
   wherein an input/output wire material extending from the equipment or an accessory member associated with the equipment is disposed in the third isolated space.
7. The encasement apparatus according to claim 1, further comprising:
   a support device configured to support the case main body.
8. The encasement apparatus according to claim 7,
   wherein the case main body comprises a first opening portion communicating with the first isolated space and a second opening portion communicating with the second isolated space,
   wherein the equipment comprises at least one intake port and at least one discharge port, and
   wherein the support device comprises a first blower device configured to send air to the at least one intake port of the equipment by way of the first opening portion and a second blower device configured to send gas discharged from the at least one discharge port of the equipment by way of the second opening portion to an outside of the case main body.
9. The encasement apparatus according to claim 7, further comprising:
   an adjustment member configured to adjust a posture of the case main body with respect to the support device.
10. The encasement apparatus according to claim 9,
    wherein the support device comprises a fixing member,
    wherein the adjustment member is fixed to an attachment member to which the equipment is attached, and the posture of the case main body with respect to the support device is adjusted as a result of a position of the adjustment member with respect to the fixing member being adjusted.
11. The encasement apparatus according to claim 10,
    wherein the fixing member comprises an engagement hole in which the adjustment member can move.
12. The encasement apparatus according to claim 11,
    wherein the support device comprises a link member which is fixed to the fixing member,
    wherein the link member comprises a first attachment hole corresponding to the engagement hole, and
    wherein the adjustment member comprises a screw, the screw being attached to the attachment member via the first attachment hole of the link member and the engagement hole of the fixing member.
13. The encasement apparatus according to claim 12,
    wherein the fixing member comprises a fulcrum shaft,
    wherein the link member comprises a fulcrum hole provided to correspond to the fulcrum shaft, and
    wherein the link member rotates freely about the fulcrum shaft.

14. The encasement apparatus according to claim 13,
wherein the link member comprises a second attachment hole at an opposite end to the first attachment hole across the fulcrum hole, and
wherein the fixing member is screwed to the link member via the second attachment hole of the link member.

15. A projection system, comprising:
the encasement apparatus according to claim 1; and
a projector as the equipment.

16. An encasement apparatus comprising:
a case main body configured to freely encase equipment in an inside portion thereof,
wherein the case main body comprises a first partition wall configured to divide a space in the inside portion into a first isolated space and a second isolated space together with the equipment in such a state that the equipment is encased in the inside portion,
wherein the equipment comprises at least one intake port and at least one discharge port, and
wherein in such a state that the equipment is brought into abutment directly or indirectly with the first partition wall and the equipment is encased in the inside portion of the case main body, the at least one intake port and the at least one discharge port of the equipment are individually disposed in the first isolated space and the second isolated space which are isolated from each other by the equipment and the first partition wall.

17. The encasement apparatus according to claim 16,
wherein the at least one discharge port of the equipment is not disposed in the first isolated space, and the at least one intake port of the equipment is not disposed in the second isolated space.

* * * * *